(12) United States Patent
Burcher et al.

(10) Patent No.: US 12,291,451 B2
(45) Date of Patent: May 6, 2025

(54) PROCESS FOR PRODUCING AND REGENERATING HYDROGEN CARRIER COMPOUNDS

(71) Applicant: HYSILABS SAS, Aix-en-Provence (FR)

(72) Inventors: Benjamin Burcher, Saint-Jorioz (FR); Vincent Lome, Chateaurenard (FR); Remy Benoit, Villeneuves-les-Avignon (FR)

(73) Assignee: HYSILABS SAS (FR)

( * ) Notice: Subject to any disclaimer, the term of this patent is extended or adjusted under 35 U.S.C. 154(b) by 581 days.

(21) Appl. No.: 17/770,526

(22) PCT Filed: Oct. 29, 2020

(86) PCT No.: PCT/EP2020/080468
§ 371 (c)(1),
(2) Date: Apr. 20, 2022

(87) PCT Pub. No.: WO2021/084046
PCT Pub. Date: May 6, 2021

(65) Prior Publication Data
US 2023/0002220 A1    Jan. 5, 2023

(30) Foreign Application Priority Data

Oct. 31, 2019   (EP) ..................................... 19306415
Jun. 2, 2020    (EP) ..................................... 20305574

(51) Int. Cl.
*C01B 3/00*         (2006.01)
*C01B 33/04*        (2006.01)
(Continued)

(52) U.S. Cl.
CPC ............ *C01B 3/0015* (2013.01); *C01B 33/04* (2013.01); *C01B 33/113* (2013.01); *C01B 33/126* (2013.01)

(58) Field of Classification Search
CPC ......... C01B 3/001; C01B 3/0015; C01B 3/06; C01B 3/065; C01B 33/04; C01B 33/113;
(Continued)

(56) References Cited

U.S. PATENT DOCUMENTS 3,937,782 A * 2/1976 Blount .................... C01B 33/00
                                                              423/325
5,091,162 A * 2/1992 Frye .................... C04B 41/5035
                                                              423/325

(Continued)

FOREIGN PATENT DOCUMENTS

EP          2206679 A1     7/2010
WO     2007018283 A1       2/2007
(Continued)

OTHER PUBLICATIONS

Chojnowski et al. Makromol. Chem., Rapid Commun. 1983, 4, 703-706 (Year: 1983).*

(Continued)

*Primary Examiner* — Michael Forrest
*Assistant Examiner* — Jordan W Taylor
(74) *Attorney, Agent, or Firm* — MASCHOFF BRENNAN

(57) ABSTRACT

The present invention relates to a process for producing and for regenerating siloxane hydrogen carrier compounds.

21 Claims, 8 Drawing Sheets

(51) Int. Cl.
*C01B 33/113* (2006.01)
*C01B 33/12* (2006.01)

(58) Field of Classification Search
CPC ...... C01B 33/126; C08G 77/06; C08G 77/10; C08G 77/12; Y02E 60/32; Y02E 60/36
See application file for complete search history.

(56) References Cited

U.S. PATENT DOCUMENTS

| | | | |
|---|---|---|---|
| 8,097,690 B2* | 1/2012 | Harimoto | C03C 3/06 |
| | | | 106/287.34 |
| 2009/0041649 A1* | 2/2009 | Fester | C07F 7/025 |
| | | | 423/325 |

FOREIGN PATENT DOCUMENTS

| | | |
|---|---|---|
| WO | 2009080986 A2 | 7/2009 |
| WO | 2010070001 A1 | 6/2010 |
| WO | 2010094785 A1 | 8/2010 |
| WO | 2011098614 A1 | 8/2011 |
| WO | 2011141287 A1 | 11/2011 |
| WO | 2013109918 A1 | 7/2013 |
| WO | 2014082801 A2 | 6/2014 |
| WO | 2015146170 A1 | 10/2015 |

OTHER PUBLICATIONS

Greenberg et al. J. Phys. Chem. 1955, 59, 5, 435-440 (Year: 1995).*
European Patent Office; International Search Report and Written Opinion issued in International Application No. PCT/EP2020/080468 dated Feb. 11, 2021; 12 pages.

* cited by examiner

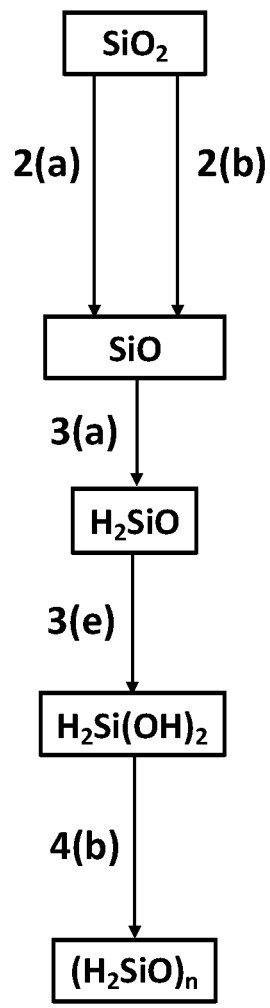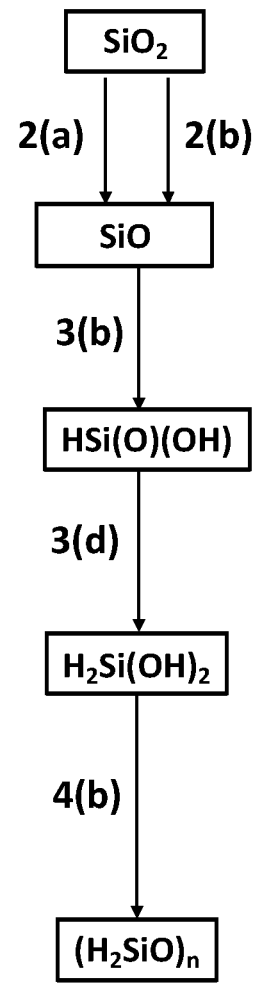
Figure 6                    Figure 7

Step 2(a) :    $1\ SiO_2 + 1\ H_2 \rightarrow 1\ SiO + 1\ H_2O$
Step 2(b) :    $1\ SiO_2 + 1\ Si \rightarrow 2\ SiO$
Step 2(c) :    $1\ SiO_2 + 2\ H_2 \rightarrow H_2SiO + H_2O$
Step 2(d) :    $1\ SiO_2 + 1\ H_2 \rightarrow HSi(O)(OH)$
Step 2(e) :    $1\ SiO_2 + 2\ H_2 \rightarrow H_2Si(OH)_2$
Step 2(f) :    $1\ SiO_2 + 4\ H_2 \rightarrow SiH_4 + 2\ H_2O$ Step 3(a) :    $2\ SiO + 2\ H_2 \rightarrow 2\ H_2SiO$
Step 3(b) :    $2\ SiO + 2\ H_2O \rightarrow 2\ HSi(O)(OH)$
Step 3(c) :    $HSi(O)(OH) + H_2 \rightarrow H_2SiO + H_2O$
Step 3(d) :    $HSi(O)(OH) + H_2 \rightarrow H_2Si(OH)_2$
Step 3(e) :    $H_2SiO + H_2O \rightarrow H_2Si(OH)_2$
Step 3(f) :    $SiH_4 + 2\ H_2O \rightarrow H_2Si(OH)_2 + 2\ H_2$ Step 4(a) :    $n\ H_2SiO \rightarrow (H_2SiO)_n$
Step 4(b) :    $n\ H_2Si(OH)_2 \rightarrow (H_2SiO)_n + n\ H_2O$
Step 4(c) :    $n\ SiH_4 + n\ O_2 \rightarrow (H_2SiO)_n + n\ H_2O$

Figure 9

Step 1:  + 4 H$_2$O ⟶ 4 SiO$_2$ + 8 H$_2$ and Step 2:
 a) 4 SiO$_2$ + 4 H$_2$ ⟶ 4 SiO + 4 H$_2$O
 or
 b) 4 SiO$_2$ + 4 Si ⟶ 8 SiO
 or
 c) 4 SiO$_2$ + 8 H$_2$ ⟶ 4 H$_2$SiO + 4 H$_2$O
 or
 d) 4 SiO$_2$ + 4 H$_2$ ⟶ 4 HSi(O)(OH)
 or
 e) 4 SiO$_2$ + 8 H$_2$ ⟶ 4 H$_2$Si(OH)$_2$
 or
 f) 4 SiO$_2$ + 16 H$_2$ ⟶ 4 SiH$_4$ and Step 3:
 a) 4 SiO + 4 H$_2$ ⟶ 4 H$_2$SiO
 or
 b) 4 SiO + 4 H$_2$O ⟶ 4 HSi(O)(OH)
 or
 c) 4 HSi(O)(OH) + 4 H$_2$ ⟶ 4 H$_2$SiO + 4 H$_2$O
 or
 d) 4 HSi(O)(OH) + 4 H$_2$ ⟶ 4 H$_2$Si(OH)$_2$
 or
 e) 4 H$_2$SiO + 4 H$_2$O ⟶ 4 H$_2$Si(OH)$_2$
 or
 f) 4 SiH$_4$ + 8 H$_2$O ⟶ 4 H$_2$Si(OH)$_2$ + 2 H$_2$ and  Step 4:  a) 4 H$_2$SiO 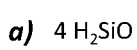 4 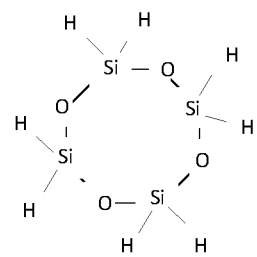
or
b) 4 H$_2$Si(OH)$_2$ 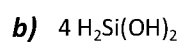 4 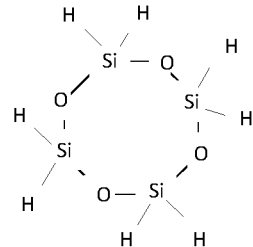 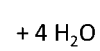 + 4 H$_2$O
or
c) 4 SiH$_4$ + 4 O$_2$ 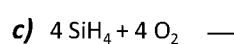 4 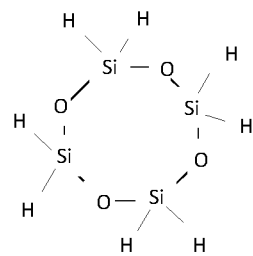 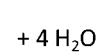 + 4 H$_2$O
Figure 11

PROCESS FOR PRODUCING AND REGENERATING HYDROGEN CARRIER COMPOUNDS

CROSS-REFERENCE TO RELATED APPLICATIONS

This patent application is a nationalization of PCT Application No. PCT/EP2020/080468 filed Oct. 29, 2020, which claims priority to EP 19306415.1 filed Oct. 31, 2019 and EP 20305574.4 filed Jun. 2, 2020, which applications are incorporated herein by specific reference in their entirety.

BACKGROUND

Field

The present invention relates to a process for producing and for regenerating siloxane hydrogen carrier compounds. The present invention also relates to siloxane hydrogen carrier compounds and to a method for producing hydrogen from said siloxane hydrogen carrier compounds.

Description of Related Art

The ability to store, transport and release hydrogen in a safe, convenient, and environment-friendly manner source and to produce and store hydrogen efficiently, economically and safely, are main challenges to be overcome in order to democratize the use of hydrogen as an energy vector.

Currently hydrogen is mainly delivered either by pipeline, by tube trailers as a compressed gas or by special tankers in its liquefied form.

There are typically six routes for hydrogen delivery: it can be transported as a gas by pipeline, it can be produced on site, it can be transported as a compressed gas in tube trailers (for example as disclosed in WO2013/109918 (A1)), it can be transported as a condensed liquid in cryogenic trucks (for example as disclosed in WO2011/141287 (A1)), it can be stored in a solid-state hydrogen carrier material and released on-site (for example as disclosed in WO2009/080986 (A2)), and stored in a liquid-state hydrogen carrier material and released on-site.

Hydrogen can be produced on-site by two means. It can be produced on site by one process and directly consumed in another process which is defined as captive hydrogen. The other mean of on-site production is by water electrolysis, which produces hydrogen from water and electricity. It can be considered producing an environment-friendly hydrogen if powered by renewable energy.

In addition to incumbent delivery solutions which are cryogenic and compressed hydrogen, alternative solutions are emerging to provide hydrogen:hydrogen carriers. Hydrogen carriers are either solid-state or liquid-state materials that have the ability to store hydrogen and release it when needed. They bring advantages either for transport or storage, compared to incumbent solutions. Solid-state carriers include metallic hydrides enabling the uptake of hydrogen, by adsorption onto metal particles resulting in metal hydride. Among them, the magnesium hydride is stable at low pressure and standard temperature, making it convenient to transport and store. When needed, the material is heated to release the hydrogen gas. Solid-state solutions have been identified as best suited for same-site reversible processes of energy storage from renewable energies. Indeed, handling solid materials is not as convenient as handling gas or liquid ones.

Liquid hydrogen carriers can be any liquid-state material able to release hydrogen under specific conditions. The class of Liquid Organic Hydrogen Carriers (LOHC) is the most represented among the liquid hydrogen carriers. During the process called hydrogenation, which is a catalytic reaction, requiring energy in the form of heat, hydrogen is chemically bonded to the liquid organic carrier. Typically the carrier, being unsaturated and/or aromatic hydrocarbons such as toluene, is reacted with hydrogen to produce the corresponding saturated hydrocarbon, to be transported in a liquid-state at standard temperature and pressure, for example as described in WO2014/082801 (A1) or WO2015/146170 (A1). Although the amount of hydrogen to be stored in LOHC depends on the yield of the hydrogenation process it is up to 7.2% mass of hydrogen contained per mass of liquid carrier. Then the hydrogen is released from the saturated hydrocarbons by a process called dehydrogenation, which is a catalytic reaction, requiring additional energy in the form of heat (above 300° C. typically) due to the endothermic nature of the reaction. In order to produce on-demand hydrogen, heat may be produced from grid electricity (without control on its origin and on its impact on the environment) or heat may be retrieved by burning a part of the organic carrier.

Patent applications WO2010070001 (A1) and EP2206679 (A1) relate to a method for producing hydrogen comprising the steps consisting in: a) reacting a compound (C) comprising one or more groups Si—H with a fluoride ions source, thereby forming hydrogen and a by-product (C1); and b) recovering the obtained hydrogen. All the examples use silane compounds as hydrogen carriers; with the proviso of polymethylhydrosiloxane ("PHMS") in examples 1-2 and tetramethyldisiloxane in example 8.

Patent application WO2011098614 (A1) relates to a method for producing hydrogen comprising the steps of: i) contacting a compound (C) comprising one or more groups Si—H with a phosphorous based catalyst in the presence of a base in water as solvent, thereby forming hydrogen and a by-product (C1) without requiring any energy input (e.g. heat, electrical power, etc. . . . ); and ii) recovering the obtained hydrogen. All the examples use silane compounds as hydrogen carriers; tetramethyldisiloxane is the only siloxane containing compound recited in the lists of potential hydrogen carrier. WO2011098614 (A1) also discloses a step c) of recycling the obtained by-product (C1) with an acyl halide and contacting the obtained product with a metal hydride, thereby regenerating compound (C), wherein the acyl halide is $CH_3C(=O)Cl$ and the metal hydride is $LiAlH_4$. Patent application WO2010094785 (A1) relates to a method for producing hydrogen comprising the steps of: i) contacting a compound (C) comprising one or more groups Si—H with an amine based catalyst in a solvent selected from an alcohol or an aqueous solution, thereby forming hydrogen and a by-product (C1) without requiring any energy input (e.g. heat, electrical power etc. . . . ); and ii) recovering the obtained hydrogen. Most of the examples use silane compounds as hydrogen carriers; with the proviso of polymethylhydrosiloxane ("PHMS") in example 12 and tetramethyldisiloxane in example 16. WO2010094785 (A1) also discloses a step c) of recycling the obtained by-product (C1) with an acyl halide and contacting the obtained product with a metal hydride, thereby regenerating compound (C), wherein the acyl halide is $CH_3C(=O)Cl$ and the metal hydride is $LiAlH_4$.

Whilst WO2010070001 (A1), EP2206679 (A1), WO2011098614 (A1) and WO2010094785 (A1) already represent a breakthrough in the field of hydrogen-based carrier system that releases hydrogen on-demand, said techniques would still benefit from improved efficiency, performance, and cost effectiveness; in addition, since the overall regeneration method of the hydrogen-based carrier according to both WO2011098614 (A1) and WO2010094785 (A1) requires the use of the expensive LiAlH4 reducing agent leading to aluminium oxide by-products, which retreatment process is energy-consuming (a lot of electricity is needed for the electrolysis step), is polluting, and releases carbon dioxide ($CO_2$), carbon monoxide (CO), fluorinated effluents and polycyclic aromatic hydrocarbons (PAH), there is still some progress to be made in order to develop a more environmentally friendly and carbon-free regeneration method applicable to hydrogen-based carrier. Thus, there remains a need for further improvements in efficiency, performance, and cost effectiveness of such clean energy vectors, for a variety of applications, such as hydrogen delivery and hydrogen infrastructure building. There remains a need for improvements which exhibit greater amounts of hydrogen to be transported, enhanced efficiency, performance and that are cost effective. There remains a critical need for environment-friendly liquid-state hydrogen carriers that are able to release on-demand hydrogen without the need for additional energy. In addition, there remains a need for an integrated clean process wherein hydrogen carriers can not only be used as a valuable hydrogen source but also be produced without requiring carbon containing reactant and/or without carbon emissions, and also be regenerated from the by-products of the hydrogen separation environmentally friendly and without substantial carbon emissions, preferably without carbon emissions.

SUMMARY

It now has been discovered that liquid siloxane hydrogen carrier compounds can be produced from silica compound and/or silicate compound only requiring hydrogen and/or water and/or silicon and/or oxygen as additional reactant(s) and/or without substantial carbon emissions, preferably without carbon emissions.

The silica compound according to the present invention can be defined as a silica containing compound, and/or a mixture of two or more of said silica containing compounds.

BRIEF DESCRIPTION OF THE FIGURES

FIG. 6 illustrates another example of process steps.
FIG. 7 illustrates another example of process steps.
FIG. 9 illustrates another example of process steps.
FIG. 11 illustrates another example of process steps.

DETAILED DESCRIPTION

Figure 1:
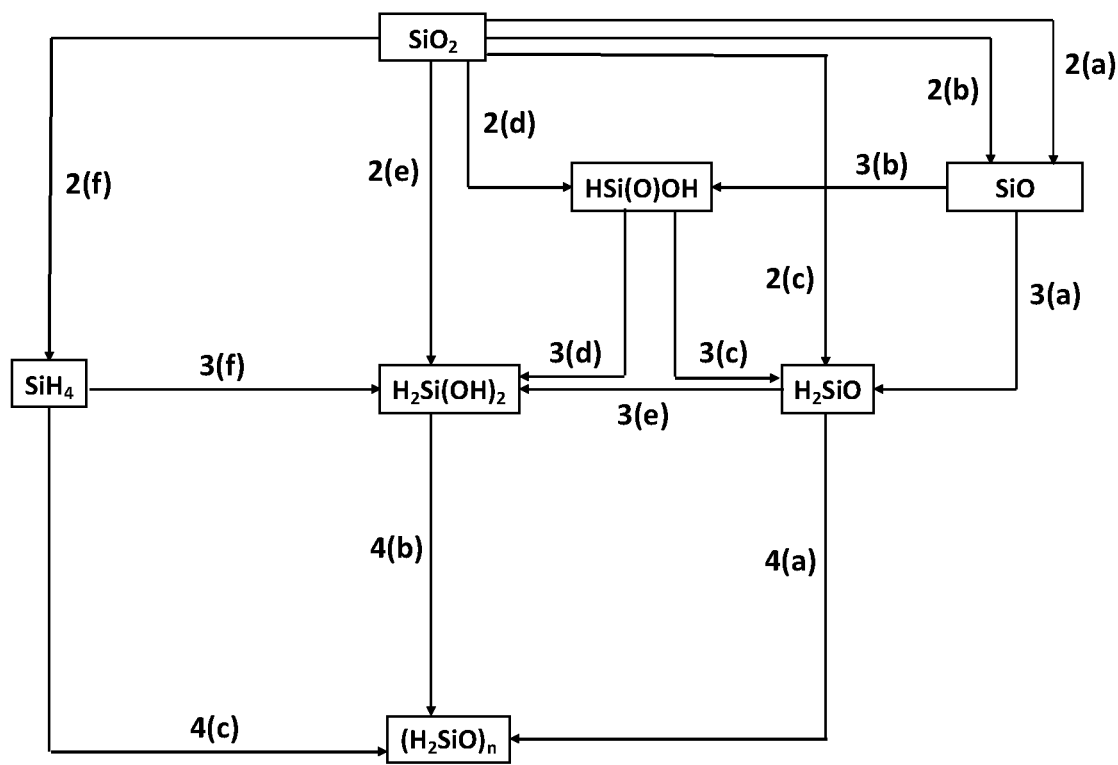
FIG. 1 illustrates an example of process steps.

In an embodiment according to the present invention, the silica compound is selected from:
 a silica compound of generic formula $SiO_{2x}H_2O$, $[SiO_2]_n$ with n superior or equal to 2, or
 a mixture of two or more of said silica compounds.

The silicate compound according to the present invention can be defined as a silicate containing compound, and/or a mixture of two or more of said silicate containing compounds.

In an embodiment according to the present invention, the silicate compound is selected from:
 a sodium or potassium silicate compound of generic formula $Na_{2x}SiO_{2+x}$ or $K_{2x}SiO_{2+x}$ with x being an integer comprised between 0 and 2, or
 a silicic acid compound of generic formula $[SiO_x(OH)_{4-x}]^{x-}$ with x being an integer comprised between 0 and 4 or of generic formula $[SiO_x(OH)_{4-2x}]_n$ with when n=1, x=0 or 1 and when n=2, x=1/2 or 3/2, or
 a silicate compound with a polymeric structure such as a disilicate ion of structure $(Si_2O_7)^{6-}$ or a macroanion of generic structure $[SiO_3^{2-}]_n$, $[Si_4O_{11}^{6-}]_n$ or $[Si_2O_5^{2-}]_n$ with n superior or equal to 2, or
 a mixture of two or more of said silicate compounds.

It has also been discovered that liquid siloxane hydrogen carrier compounds can be regenerated only requiring hydrogen and/or water and/or silicon and/or oxygen as additional reactant(s) and/or without substantial carbon emissions, preferably without carbon emissions.

One of the most important advantages of the production/regeneration processes of the present invention consist in the possibility to apply it continuously; such continuous process can also, as explained hereafter, be operated without requiring raw materials input and/or without by-product emissions.

It has also been discovered that by using some liquid siloxane hydrogen carrier compounds,
 hydrogen could be produced in large amounts, with high yields, in a very short time and with very low production costs, without energy input to release it; and
 it was possible to generate said siloxane hydrogen carrier compounds without substantial carbon emissions, preferably without carbon emissions, by storing energy and recycling the by-products issued from the hydrogen production.

The term "hydrogen carrier compound" can be understood as a chemical compound able to store hydrogen, transport hydrogen and release hydrogen on demand; the characteristic of the hydrogen carrier compounds according to the present invention is that they can store/transport/release hydrogen without requiring any energy input (e.g. heat, electrical power etc. . . . ).

Process for Producing Liquid Siloxane Hydrogen Carrier Compounds

The present invention relates to a process for producing liquid siloxane hydrogen carrier compounds from silica compound and/or silicate compound only requiring hydrogen and/or water and/or silicon and/or oxygen as additional reactant(s) and/or without substantial carbon emissions, preferably without carbon emissions.

Although the silica and/or silicate compound (B) as defined hereunder is a preferred source for the starting material for the process for producing liquid siloxane hydrogen carrier compounds according to the present invention, silica and/or other silicate containing minerals such as e.g. zircon, jade, mica, quartz, cristobalite, sand etc. . . . can advantageously be used as source of starting material for the process for producing liquid siloxane hydrogen carrier compounds. For the purposes of the present invention and appended claims, the silica and/or silicate compound (B) is preferably a silica compound and/or a silicate compound produced from the hydrolytic oxidation of the siloxane hydrogen carrier compound(s) according to the present invention.

Process for Regenerating Siloxane Hydrogen Carrier Compounds

The present invention also relates to a process for regenerating liquid siloxane hydrogen carrier compounds, said process comprising the step of hydrolytic oxidation of the siloxane hydrogen carrier compounds for the production of hydrogen and silica and/or silicate compound (B), and the step of conversion of said silica and/or silicate compound (B) into the liquid siloxane hydrogen carrier compounds, said process only requiring hydrogen and/or water and/or silicon and/or oxygen as additional reactant(s) and/or without substantial carbon emissions, preferably without carbon emissions.

The production and regeneration of liquid siloxane hydrogen carrier compounds according to the present invention is further detailed and explained in the following description. Having managed to develop corresponding processes only requiring hydrogen and/or water and/or silicon and/or oxygen as additional reactant(s) and/or without substantial carbon emissions, preferably without carbon emissions represents a breakthrough in the field of hydrogen energy, hydrogen transport and hydrogen for the automotive industry.

Siloxane Hydrogen Carrier Compounds

In an embodiment of the present invention, the liquid siloxane hydrogen carrier compounds which can advantageously be produced and/or regenerated by using the claimed process are selected amongst (I) liquid linear siloxane hydrogen carrier compounds of formula (I):

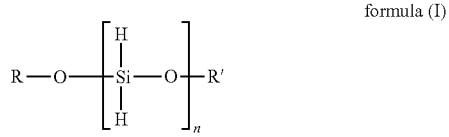

formula (I)

wherein n is an integer (representing the number of repeating units) superior or equal to one and wherein radicals R and R' don't contain carbon and wherein R and R' comprises Si and hydrogen and/or oxygen, or (II) cyclic siloxane compounds having the formula (II)

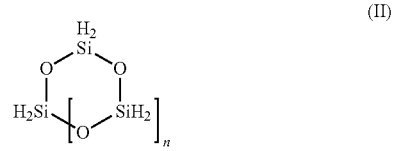

(II)

wherein n is an integer (representing the number of repeating units $H_2SiO$) superior or equal to one.

In an embodiment, the present invention, in formula (I), n is preferably superior or equal to 2, for example superior or equal to 3, or even superior or equal to four; in an embodiment of the present invention, n is inferior or equal to 500, for example inferior or equal to 50.

In an embodiment, the present invention, in formula (II), n is preferably superior or equal to 2, for example superior or equal to 3, or even superior or equal to four; in an embodiment of the present invention, n is inferior or equal to 500, for example inferior or equal to 32, for example inferior or equal to 17.

Such compounds present tremendous advantages compared to their poly(hydromethyl)siloxane analogs $(ROMe_nH_nSi_nO_nR')$. As an example poly(bis(hydro))siloxane can release more than twice (2.61 exactly for the same weight) the amount of hydrogen gas when compared to poly(hydromethyl)siloxane. Also, poly(bis(hydro))siloxane compounds exhibit a full carbon-free recyclability (when used in the hydrogen production and siloxanes production/regeneration processes according to the present invention) compared to analogs containing carbon fragments in their backbone.

In an embodiment of the present invention, the above carbon-free R and R' radicals of formula (I) are selected from $-SiH_3$, $-SiH_2OH$, $-SiH(OH)_2$, $-Si(OH)_3$; preferred radicals are $-SiH_3$ or $-SiH_2OH$.

Illustrative examples of the liquid linear siloxane hydrogen carrier compounds according to the present invention are:

$H_3SiOH_{2n}Si_nO_nSiH_3$, $H_3SiOH_{2n}Si_nO_nSiH_2OH$, $H_3SiOH_{2n}Si_nO_nSiH(OH)_2$, $H_3SiOH_{2n}Si_nO_nSi(OH)_3$, $(OH)_3SiOH_{2n}Si_nO_nSi(OH)_3$, $(OH)_3SiOH_{2n}Si_nO_nSiH(OH)_2$, $(OH)_3SiOH_{2n}Si_nO_nSiH_2OH$, $OHH_2SiOH_{2n}Si_nO_nSiH_2OH$, $OHH_2SiOH_{2n}Si_nO_nSiH(OH)_2$, $(OH)_2HSiOH_{2n}Si_nO_nSiH(OH)_2$.

or a mixture of two or more of these compounds, with n being an integer superior or equal to 1, preferably superior or equal to 2, for example superior or equal to 3, or even superior or equal to four. In an embodiment of the present invention, n is inferior or equal to 500, for example inferior or equal to 50.

In an embodiment of the present invention, the above cyclic siloxane compounds of formula (II) are selected amongst one or more or more of the following compounds:

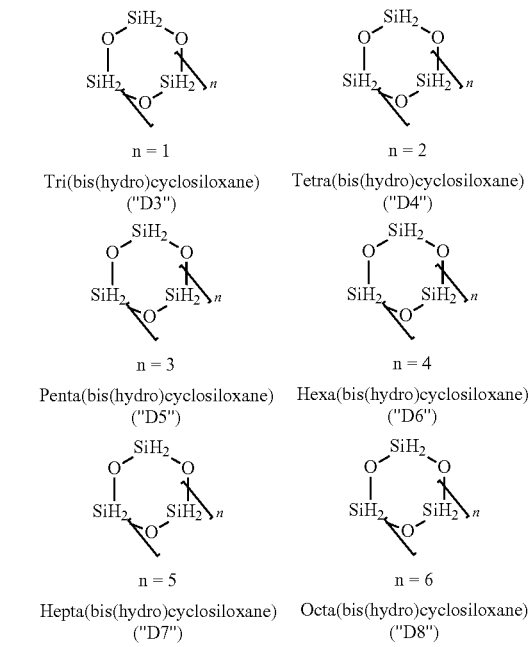

n = 1
Tri(bis(hydro)cyclosiloxane) ("D3")

n = 2
Tetra(bis(hydro)cyclosiloxane) ("D4")

n = 3
Penta(bis(hydro)cyclosiloxane) ("D5")

n = 4
Hexa(bis(hydro)cyclosiloxane) ("D6")

n = 5
Hepta(bis(hydro)cyclosiloxane) ("D7")

n = 6
Octa(bis(hydro)cyclosiloxane) ("D8")

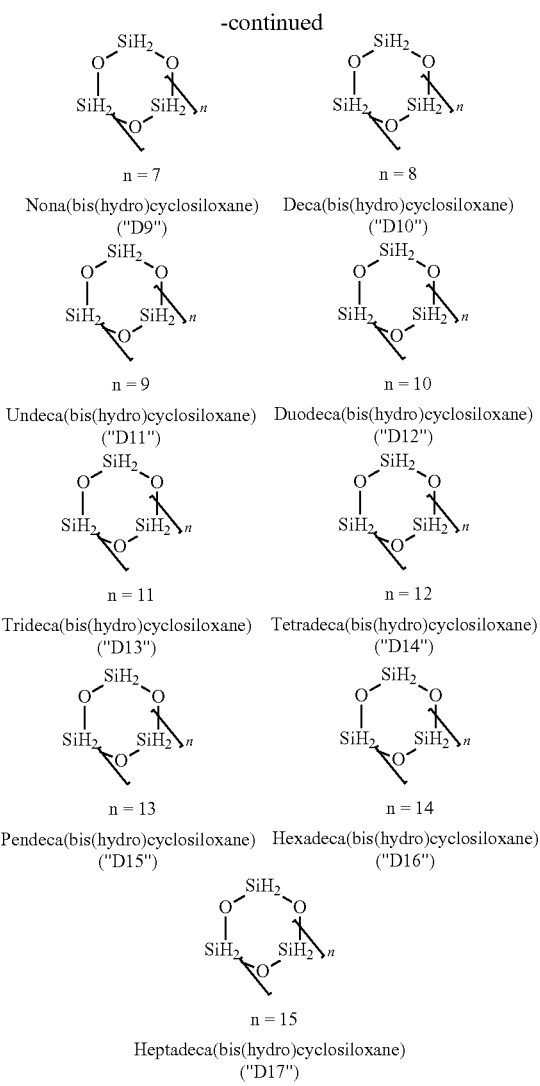

Nona(bis(hydro)cyclosiloxane) ("D9") n = 7
Deca(bis(hydro)cyclosiloxane) ("D10") n = 8
Undeca(bis(hydro)cyclosiloxane) ("D11") n = 9
Duodeca(bis(hydro)cyclosiloxane) ("D12") n = 10
Trideca(bis(hydro)cyclosiloxane) ("D13") n = 11
Tetradeca(bis(hydro)cyclosiloxane) ("D14") n = 12
Pendeca(bis(hydro)cyclosiloxane) ("D15") n = 13
Hexadeca(bis(hydro)cyclosiloxane) ("D16") n = 14
Heptadeca(bis(hydro)cyclosiloxane) ("D17") n = 15

For the above linear siloxane hydrogen carrier compounds according to formula (I), a carbon-free radical (e.g. $SiH_3$) chain end is selected since it presents many advantages (compared to other carbon containing chain ends such as $SiMe_3$ for instance):

lower molecular weight and better hydrogen content allowing a better weight gravimetric efficiency of the siloxane compound, meaning a higher ratio between the weight of hydrogen carried by the compound compared to its overall molecular weight.

Straightforward and without any carbon emissions recycling of the $SiH_3$ chain end, when compared to $SiMe_3$ for instance, due to the hydrolysable nature of the —$SiH_3$ fragment, which is not the case of Si-Me bonds.

In another embodiment of the present invention, the liquid siloxane hydrogen carrier compounds consist in a mixture of two or more of any of the above defined siloxane hydrogen carrier compounds.

In this "mixture" embodiment, when linear siloxane hydrogen carrier compounds of formula (I) represent the main species in substance amount (in mol) in the mixture (i.e. represent more than 50 mole percent), it is advantageous to restrict the amount of cyclic siloxane hydrogen carrier compounds of formula (II) to less than 20 mole percent, for example less than 10 mole percent in the mixture; in an embodiment, more than 0.01 mole percent, or even more than 0.1 mole percent of cyclic siloxane hydrogen carrier compounds of formula (I) can advantageously be present in said mixture.

In an embodiment according to the present invention, the molar ratio of the linear species regarding cyclic species in the "mixture" can be determined by $^1H$ NMR analysis for example.

In this "mixture" embodiment, when cyclic siloxane hydrogen carrier compounds of formula (II) represent the main species in substance amount (in mol) in the mixture (i.e. represent more than 50 mole percent), it is advantageous to restrict the amount of linear siloxane hydrogen carrier compounds of formula (I) to less than 45 mole percent, for example less than 20 mole percent in the mixture; in an embodiment, more than 1.0 mole percent, or even more than 5.0 mole percent of linear siloxane hydrogen carrier compounds of formula (I) can advantageously be present in said mixture.

In an embodiment according to the present invention, the liquid siloxane hydrogen carrier compounds (e.g. those of formula (I) and of formula (II)) present a dynamic viscosity between 0.1 and 10000 mPa·s at a temperature of 20° C. and a pressure of $1.01325 \times 10^5$ Pa. In an embodiment according to the present invention, the liquid siloxane hydrogen carrier compounds present a dynamic viscosity between 0.2 and 50 mPa·s at a temperature of 20° C. and a pressure of $1.01325 \times 10^5$ Pa. The dynamic viscosity at a temperature of 20° C. and a pressure of $1.01325 \times 10^5$ Pa of the siloxane hydrogen carrier compounds can be measured according to any appropriate method; for example, it can be determined according to the ISO 1628-1 norm.

In an embodiment according to the present invention, the molecular weight of the liquid cyclic siloxane hydrogen carrier compounds of formula (II) may range from 130 to 800 g/mol. The molecular weight of the siloxane hydrogen carrier compounds of formula (I) can be measured according to any appropriate method; for example, it can be determined by GC-MS, e.g. a GC-MS analysis performed on an Agilent GC/MSD 5975C apparatus.

In an embodiment according to the present invention, the number average molecular weight ($M_n$) and/or the molecular weight distribution (Đ) of the liquid linear siloxane hydrogen carrier compounds of formula (I) may range from 64 to 30 000 g/mol and from 1.1 to 50, respectively. The average molecular weight and the molecular weight distribution of the linear siloxane hydrogen carrier compounds of formula (I) can be measured according to any appropriate method; for example, it can be determined according to the ISO 16014 norm.

In an embodiment according to the present invention, the liquid cyclic siloxane hydrogen carrier compounds of formula (II) present a characteristic strong and sharp absorption band between 800 and 1000 $cm^{-1}$ corresponding to the $SiH_2$ units, when analysed by FT-IR. In an embodiment according to the present invention, the cyclic siloxane hydrogen carrier compounds of formula (II) present a characteristic strong and sharp absorption band between 850 and 950 $cm^{-1}$.

In an embodiment according to the present invention, the above liquid siloxane hydrogen carrier compounds (e.g. those of formula (I) and of formula (II)) present a characteristic resonance between 4.5 and 4.9 ppm corresponding to the $SiH_2O$ units, when analysed by $^1H$ NMR in $CDCl_3$ at 25° C. $^1H$ NMR analyses can be performed on any appropriate spectrometer, e.g. a 400 MHz Bruker spectrometer.

In an embodiment according to the present invention, the above liquid siloxane hydrogen carrier compounds (e.g. those of formula (I) and of formula (II)) present a characteristic resonance between −45 and −50 ppm corresponding to the SiH$_2$O units, when analysed by $^{29}$Si NMR in CDCl$_3$ at 25° C. $^{29}$Si NMR analyses can be performed on any appropriate spectrometer, e.g. a 400 MHz Bruker spectrometer.

In an embodiment according to the present invention, the liquid siloxane hydrogen carrier compounds (e.g. those of formula (I) and of formula (II)) present a refractive index between 1 and 2 at a temperature of 20° C. and at a wavelength of 589 nm. In an embodiment according to the present invention, the liquid siloxane hydrogen carrier compounds (e.g. those of formula (I) and of formula (II)) present a refractive index between 1.2 and 1.5 at a temperature of 20° C. and at a wavelength of 589 nm. The refractive index of the siloxane hydrogen carrier compounds can be measured according to any appropriate method; for example, it can be determined according to the ASTM D1218 norm.

In an embodiment according to the present invention, the liquid siloxane hydrogen carrier compounds (e.g. those of formula (I) and of formula (II)) present a boiling point between 30 and 500° C., for example between 50 and 500° C., at a pressure of 1.01325×10$^5$ Pa, for example a boiling point comprised between 50 and 200° C. The boiling point of the liquid siloxane hydrogen carrier compounds can be measured according to any appropriate method; for example, it can be determined according to the ISO 918 norm.

In an embodiment according to the present invention, the liquid siloxane hydrogen carrier compounds (e.g. those of formula (I) and of formula (II)) present a flash point between 0 and 500° C., preferably between 30 and 60° C. The flash point of the siloxane hydrogen carrier compounds can be measured according to any appropriate method; for example, it can be determined according to the ISO 3679 norm.

In an embodiment according to the present invention, the liquid siloxane hydrogen carrier compounds consist in any mixture of two or more of the said liquid cyclic siloxane compounds of formula (II); for example, said mixture may comprise at least 5 mole percent of [H$_2$SiO]$_4$, at least 20 mole percent of [H$_2$SiO]$_5$, at least 5 mole percent of [H$_2$SiO]$_6$ and at least 40 mole percent of [H$_2$SiO]$_{7+}$ species (i.e. formula (II) compounds with n respectively equal to 2, 3, 4 and equal or higher to 5) relative to the sum of the moles of siloxane hydrogen carrier compounds of formula (II) in the mixture.

In an embodiment according to the present invention, the liquid siloxane hydrogen carrier compounds consist in any mixture of two or more of the said liquid linear siloxane compounds of formula (I); said mixture preferably comprises at least 50 mol % of compounds of formula (I) wherein n is comprised between 10 and 30 (i.e. having between 10 and 30 repeating units of H$_2$SiO) relative to the sum of the moles of siloxane hydrogen carrier compounds of formula (I) in the mixture, for example more than 80 mol %.

According to the present invention, the siloxane hydrogen carrier compounds (e.g. those of formula (I) and of formula (II)) are liquid (at normal temperature and pressure (NTP); e.g. at a temperature of 20° C. and an absolute pressure of 1.01325×10$^5$ Pa).

Hydrogen Production

The present invention also relates to a method for the production of hydrogen by hydrolytic oxidation of siloxanes in the presence of water wherein the siloxanes are selected amongst the above formula (I) and formula (II) compounds.

In an embodiment according to the present invention, the method for the production of hydrogen is characterised in that the water/[SiOH$_2$] unit molar ratio is superior or equal to 0.1. In an embodiment of the present invention, the said mixture of the siloxanes and water is characterised by a water/[SiOH$_2$] unit molar ratio which is comprised between 2 and 10, for example between 2 and 2.5.

In an embodiment of the present invention, the method for the production of hydrogen is characterised in the presence of at least one hydrogen release initiator during the hydrolytic oxidation of siloxanes in the presence of water. There is no restriction regarding the type of hydrogen release initiator which can be used according to the present invention as long as it favours the hydrolytic oxidation of the siloxane hydrogen carrier compounds of formula (I); and thus the water/siloxane reaction leading to the corresponding hydrogen release. For example, any compound which will favour the hydrolytic oxidation of the siloxane can advantageously be used as hydrogen release initiator; useful hydrogen release initiators can be selected amongst one or more compounds of the following list:

- a mineral base. For example, the mineral base can be an alkaline or alkaline-earth metal hydroxide such as potassium hydroxide or sodium hydroxide, the sodium hydroxide being particularly preferred;
- a protic acid. For example, the protic acid can be a mineral acid or an organic acid; e.g. hydrochloric acid, sulfuric acid, carboxylic acids (methanoic, ethanoic acid . . . ) etc . . . ;
- a compound able to release a nucleophile able to perform the hydrolytic oxidation of the siloxane hydrogen carrier compound such as, for example, a compound of formula RR'R"R'"ZY with Z being N or P, Y being OH, F, Cl or Br and R, R', R" and R'" can be advantageously selected amongst C$_1$-C$_{15}$ alkyl or C$_6$-C$_{10}$ aryl, with R, R', R", R'" being the same of different;
- a homogeneous organometallic catalyst able to promote the hydrolytic oxidation of the siloxane hydrogen carrier compound such as, for example, organometallic complexes based on iron, ruthenium, rhenium, rhodium, copper, chromium, iridium, zinc, and/or tungsten, etc . . . ; and
- a heterogeneous catalyst able to promote the hydrolytic oxidation of the siloxane hydrogen carrier compound such as, for example, metal nanoparticles, [M/AlO(OH), M=Pd, Au, Rh, Ru, and Cu], Pd/C and/or any of the aforementioned metal preferably immobilized on an inorganic support.

In an embodiment of the present invention the hydrogen release initiator is selected amongst carbon-free hydrogen release initiator, e.g. sodium hydroxide.

In an embodiment of the present invention, the said mixture of siloxanes, water and hydrogen release initiator is characterised by a hydrogen release initiator/[SiOH$_2$] unit molar ratio which is superior or equal to 0.01. In an embodiment of the present invention, the said mixture of siloxanes, water and hydrogen release initiator is characterised by a hydrogen release initiator/[SiOH$_2$] unit molar ratio which is comprised between 0.05 and 3, for example between 0.05 and 0.35.

In an embodiment of the present invention, the method for the production of hydrogen is characterised in the presence of a mixture of the siloxane hydrogen carrier compounds of formula (I), water, a hydrogen release initiator as defined above and another catalyst. There is no restriction regarding the type of catalyst which can be additionally used according to the present invention as long as it increases the kinetic (i.e. the speed at which the hydrogen is released) of the hydrolytic oxidation of the siloxane hydrogen carrier compounds of formula (I) and/or formula (II); and thus the water/siloxane/hydrogen release initiator/catalyst reaction leading to the corresponding hydrogen release. For example, any compound which will significantly increase the kinetic of the hydrolytic oxidation of the siloxane can advantageously be used as catalyst. In an embodiment of the present invention, the said mixture of siloxanes, water, hydrogen release initiator and catalyst is characterised by a molar ratio of the catalyst relative to the [$SiOH_2$] monomer units which ranges from 0.01 to 0.5. Preferably the molar ratio of the catalyst C relative to the [$SiOH_2$] monomer units ranges from 0.02 to 0.1. More preferably the molar ratio of the catalyst C relative to the [$SiOH_2$] monomer units is lower than 0.05, e.g equal to 0.04.

The present invention also relates to the use of the selected siloxane hydrogen carrier compounds of formula (I) and/or formula (II) for the production of hydrogen.

There is no restriction regarding the methods which can be used for the hydrogen production method according to the present invention as long as the hydrogen release from the water/hydrogen carrier compounds of formula (I) and/or formula (II) may not require additional energy and satisfies the hydrogen industry requirements.

In an embodiment according to the present invention, the temperature of the method for the production of hydrogen from siloxane hydrogen carrier compounds of formula (I) and/or formula (II) may vary in a wide range, and may range notably from 0 to 200° C. More preferably, the temperature ranges from 15 to 30° C.

In an embodiment according to the present invention, the pressure of the method for the production of hydrogen from siloxane hydrogen carrier compounds of formula (I) and/or formula (II) may vary in a wide range, and may range notably from $1 \times 10^5$ Pa to $500 \times 10^5$ Pa.

In an embodiment according to the present invention, the method for the production of hydrogen from siloxane hydrogen carrier compounds of formula (I) and/or formula (II) can tolerate the presence of a solvent. There is no restriction regarding the type of solvent which can be used for the hydrogen production method according to the present invention as long as the hydrogen release from the hydrogen carrier compounds of formula (I) and/or formula (II) satisfies the hydrogen industry requirements.

In an embodiment according to the present invention, said solvent is selected from alcohol (e.g. methanol), aqueous solvents, organic solvents and/or a mixture of two or more of said solvents. For the purpose of the hydrogen production process according to the present invention, said solvent is considered as a reagent.

In an embodiment according to the present invention, said solvent is selected from diethylether, pentane, dichloromethane, toluene, tetrahydrofuran, methyltetrahydrofuran, cyclohexane, methylcyclohexane, or a mixture of two or more of the said cited solvents. In an embodiment according to the present invention, dichloromethane is preferred.

When cyclic siloxane hydrogen carrier compounds of formula (II) represent the main siloxanes species (as already defined hereinabove), it is advantageous to restrict the amount of solvent such that the mass ratio (in the reacting mixture) between the solvent and the cyclic siloxane hydrogen carrier compounds of formula (II) is lower than 1, preferably lower than 0.5 (mass of solvent divided by mass of cyclic compounds).

In an embodiment according to the present invention, the method for the production of hydrogen from siloxane hydrogen carrier compounds of formula (I) and/or formula (II) comprises the following steps: a) contacting the siloxane hydrogen carrier compounds of formula (I) and/or formula (II) and a catalyst to form a siloxane/catalyst mixture and: b) combining the siloxane with an aqueous solution of the hydrogen release initiator, in the presence of the catalyst, to produce hydrogen. Steps a) and b) may occur consecutively or simultaneously.

In an embodiment according to the present invention, the reaction mixture used in the method for the production of hydrogen from siloxane hydrogen carrier compounds of formula (I) and/or formula (II) is characterised in that
  the siloxane hydrogen carrier compounds of formula (I) and/or formula (II),
  corresponding silicate-type by-products,
  hydrogen,
  the water,
  the hydrogen release initiator(s), and
  the optional catalyst, and
  the optional solvents
represent at least 90 percent by weight of the said reaction mixture, preferably at least 95 percent by weight, for example at least 99 percent by weight.

In an embodiment, the present invention also relates to a device for producing hydrogen according to the method hereabove described, said device comprising a reaction chamber comprising:
  a reaction mixture inlet, said mixture comprising the siloxane hydrogen carrier compounds of formula (I) and/or formula (II) and an optional solvent;
  an hydrogen outlet;
  optionally a by-product collector; and
  optionally a surface intended to be in contact with said mixture, coated with a polymer supported catalyst as described hereabove.

Liquid Siloxane Production and Liquid Siloxane Regeneration

As explained hereinabove, the main objectives of the present invention are both to produce the hydrogen carrier compounds and to regenerate the hydrogen carrier compounds by recycling the by-products issued from the hydrogen production, environmentally friendly and/or without substantial carbon emissions, preferably without carbon emissions.

Thus, the present invention relates to a process for producing liquid siloxane hydrogen carrier compounds from silica compound and/or silicate compound, preferably from silica and/or silicate compound (B), only requiring hydrogen and/or water and/or silicon and/or oxygen as additional reactant(s) and/or without substantial carbon emissions, preferably without carbon emissions.

The present invention also relates to a process for regenerating siloxane hydrogen carrier compound(s), said process comprising the step of hydrolytic oxidation of siloxane hydrogen carrier compound(s) for the production of hydrogen and silica and/or silicate compound(s) (B), and the steps of conversion of said silica and/or silicate compound(s) (B) into siloxane hydrogen carrier compounds, preferably the same siloxane hydrogen carrier compound(s), said process only requiring hydrogen and/or water and/or silicon and/or oxygen as additional reactant(s) and/or without substantial carbon emissions, preferably without carbon emissions.

Invention

In an embodiment according to the present invention, there is provided a process for the production of a liquid siloxane hydrogen carrier compound, preferably a formula (I) and/or formula (II) liquid siloxane hydrogen carrier compound, said process comprising the following consecutive steps:

providing silica compound and/or silicate compound,
either subjecting the silica compound and/or silicate compound to a reduction step 2(a) to produce silicon monoxide (SiO), or
subjecting the silica compound and/or silicate compound to a elemental silicon-mediated disproportionation step 2(b) to produce silicon monoxide (SiO), or
subjecting the silica compound and/or silicate compound to a hydrogenation/dehydration step 2(c) to produce silanone ($H_2SiO$), or
subjecting the silica compound and/or silicate compound to a partial hydrogenation step 2(d) to produce formosilicic acid (HSi(O)(OH)), or
subjecting the silica compound and/or silicate compound to a semi-hydrogenation step 2(e) to produce dihydroxysilane ($H_2Si(OH)_2$), or
subjecting the silica compound and/or silicate compound to a full hydrogenation step 2(f) to produce silane ($SiH_4$),
then
subjecting silicon monoxide (SiO) obtained from steps 2(a) and/or 2(b) to a hydrogenation step 3(a) to produce silanone ($H_2SiO$), or
subjecting silicon monoxide (SiO) obtained from steps 2(a) and/or 2(b) to a hydration step 3(b) to produce formosilicic acid (HSi(O)(OH)), and/or
subjecting formosilicic acid (HSi(O)(OH)) obtained from steps 2(d) and/or 3(b) to a hydrogenation and dehydration step 3(c) to produce silanone ($H_2SiO$), and/or
subjecting formosilicic acid (HSi(O)(OH)) obtained from steps 2(d) and/or 3(b) to a hydrogenation step 3(d) to produce dihydroxysilane ($H_2Si(OH)_2$), and/or
subjecting silanone ($H_2SiO$) obtained from steps 2(c) and/or 3(a) and/or 3(c) to a hydration step 3(e) to produce dihydroxysilane ($H_2Si(OH)_2$), or
subjecting silane ($SiH_4$) obtained from step 2(f) to a partial hydrolysis step 3(f) to produce dihydroxysilane ($H_2Si(OH)_2$), or
proceeding directly to the next step with the dihydroxysilane ($H_2Si(OH)_2$) obtained from step 2(e), or
proceeding directly to the next step with the silanone ($H_2SiO$) obtained from step 2(c), or
proceeding directly to the next step with the silane ($SiH_4$) obtained from step 2(f),
then
subjecting silanone ($H_2SiO$) obtained from steps 2(c) and/or 3(a) and/or 3(c) to a polymerisation (e.g. polyaddition) step 4(a) to produce the said liquid siloxane hydrogen carrier compound, or
subjecting dihydroxysilane ($H_2Si(OH)_2$) obtained from steps 2(e) and/or 3(d) and/or 3(e) and/or 3(f) to a polycondensation step 4(b) to produce the said liquid siloxane hydrogen carrier compound, or
subjecting silane ($SiH_4$) obtained from step 2(f) to an oxygen-mediated partial oxidation step 4(c) to produce the said liquid siloxane hydrogen carrier compound.

Silicate/Silica.

In an embodiment to the present invention, i.e. when a silicate is selected as starting material of the siloxane production/regeneration process, an additional treatment (e.g. solvent evaporation, chemical treatment by an acid, pyrolysis . . . ) of the silicate could advantageously be used to obtain silica ($SiO_2$), the latter being used as the raw material of the siloxane process.

In an embodiment to the present invention, the silica and/or the silicate compound could be subjected to an additional mechanical treatment, e.g. grinding and/or sieving, prior to be subjected to the following steps, e.g. steps 2(a), 2(b), 2(c), 2(d), 2(e) or 2(f).

For illustrative and non-limiting purposes, examples of the siloxane production process are detailed in FIGS. 1 to 8, and FIGS. 9 to 11 illustrate examples of the individual process steps.

In an embodiment according to the present invention, there is also provided a process for the regeneration of a liquid siloxane hydrogen carrier compound, preferably a formula (I) and/or formula (II) liquid siloxane hydrogen carrier compound, said process comprising the hydrolytic oxidation of the said siloxane hydrogen carrier compound(s) for the production of hydrogen and silica and/or silicate compound (B) followed by the following consecutive steps:

either subjecting the silica compound and/or silicate compound to a reduction step 2(a) to produce silicon monoxide (SiO), or
subjecting the silica compound and/or silicate compound to a elemental silicon-mediated disproportionation step 2(b) to produce silicon monoxide (SiO), or
subjecting the silica compound and/or silicate compound to a hydrogenation/dehydration step 2(c) to produce silanone ($H_2SiO$), or
subjecting the silica compound and/or silicate compound to a partial hydrogenation step 2(d) to produce formosilicic acid (HSi(O)(OH)), or
subjecting the silica compound and/or silicate compound to a semi-hydrogenation step 2(e) to produce dihydroxysilane ($H_2Si(OH)_2$), or
subjecting the silica compound and/or silicate compound to a full hydrogenation step 2(f) to produce silane ($SiH_4$),
then
subjecting silicon monoxide (SiO) obtained from steps 2(a) and/or 2(b) to a hydrogenation step 3(a) to produce silanone ($H_2SiO$), or
subjecting silicon monoxide (SiO) obtained from steps 2(a) and/or 2(b) to a hydration step 3(b) to produce formosilicic acid (HSi(O)(OH)), and/or
subjecting formosilicic acid (HSi(O)(OH)) obtained from steps 2(d) and/or 3(b) to a hydrogenation and dehydration step 3(c) to produce silanone ($H_2SiO$), and/or
subjecting formosilicic acid (HSi(O)(OH)) obtained from steps 2(d) and/or 3(b) to a hydrogenation step 3(d) to produce dihydroxysilane ($H_2Si(OH)_2$), and/or
subjecting silanone ($H_2SiO$) obtained from steps 2(c) and/or 3(a) and/or 3(c) to a hydration step 3(e) to produce dihydroxysilane ($H_2Si(OH)_2$), or
subjecting silane ($SiH_4$) obtained from step 2(f) to a partial hydrolysis step 3(f) to produce dihydroxysilane ($H_2Si(OH)_2$), or
proceeding directly to the next step with the dihydroxysilane ($H_2Si(OH)_2$) obtained from step 2(e), or
proceeding directly to the next step with the silanone ($H_2SiO$) obtained from step 2(c), or
proceeding directly to the next step with the silane ($SiH_4$) obtained from step 2(f),
then subjecting silanone (H$_2$SiO) obtained from steps 2(c) and/or 3(a) and/or 3(c) to a polyaddition step 4(a) to regenerate the said liquid siloxane hydrogen carrier compound, or subjecting dihydroxysilane (H$_2$Si(OH)$_2$) obtained from steps 2(e) and/or 3(d) and/or 3(e) and/or 3(f) to a polycondensation step 4(b) to regenerate the said liquid siloxane hydrogen carrier compound, or subjecting silane (SiH$_4$) obtained from step 2(f) to an oxygen-mediated partial oxidation step 4(c) to regenerate the said liquid siloxane hydrogen carrier compound.

In an embodiment according to the present invention, the above process for the regeneration of the liquid siloxane hydrogen carrier compound(s) is characterised in that the regenerated liquid siloxane hydrogen carrier compound(s) are preferably substantially the same as the starting liquid siloxane hydrogen carrier compound(s), preferably exactly the same.

Figure 10:
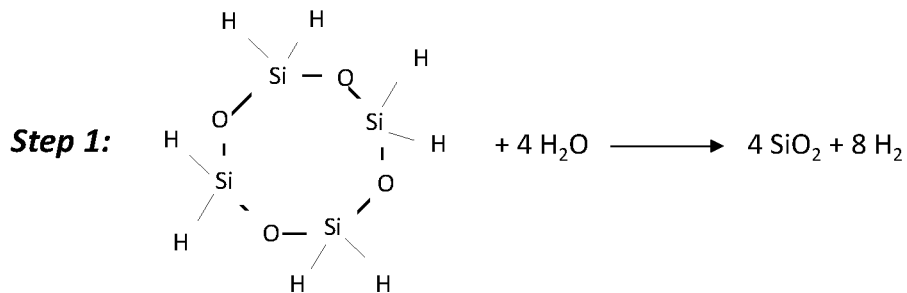
FIG. 10 illustrates another example of process steps.

For illustrative and non-limiting purposes, an example of the regeneration process starting from the siloxane hydrogen carrier compound [H$_2$SiO]$_4$ is detailed in FIGS. 10-11. Said regenerated siloxane hydrogen carrier compounds can advantageously be used in the hydrogen production method according to the present invention which allows to re-start the cycle.

A tremendous advantage brought by the polydihydrosiloxane compounds according to the present invention as hydrogen-based energy carriers (contrarily to PHMS and TMDS due to the presence of the non-hydrolysable methyl moiety bonded to the central silicon atom) is that their complete hydrolysis during the hydrogen liberation process leads uniquely a silica/silicate compound(s) (B); said silica/silicate compound(s) (B) being a straightaway starting material for an environmentally friendly and/or without substantial carbon emissions (preferably completely carbon-free) process, exhaustively exemplified and atom-economic regeneration process allowing to recover the exact starting fuel oil.

Figure 2:
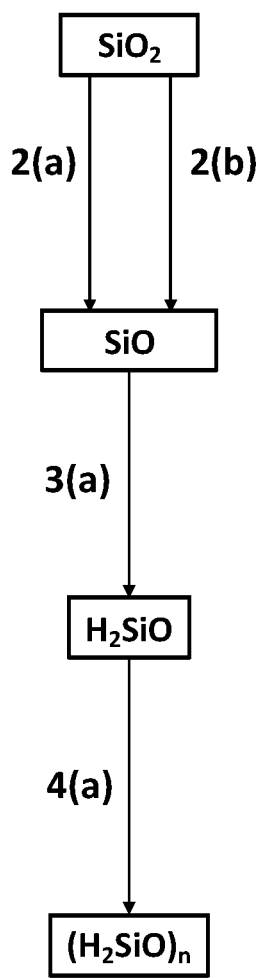
FIG. 2 illustrates another example of process steps.

In an embodiment of the present invention, which is illustrated in FIG. 2, the process for the production or regeneration of a liquid siloxane hydrogen carrier compound comprises the following consecutive steps:

either subjecting the silica compound and/or silicate compound to a reduction step 2(a) to produce silicon monoxide (SiO), or subjecting the silica compound and/or silicate compound to a elemental silicon-mediated disproportionation step 2(b) to produce silicon monoxide (SiO), then subjecting silicon monoxide (SiO) obtained from steps 2(a) or 2(b) to a hydrogenation step 3(a) to produce silanone (H$_2$SiO), then subjecting silanone (H$_2$SiO) obtained from step 3(a) to a polyaddition step 4(a) to produce or regenerate the said liquid siloxane hydrogen carrier compound.

Figure 3:
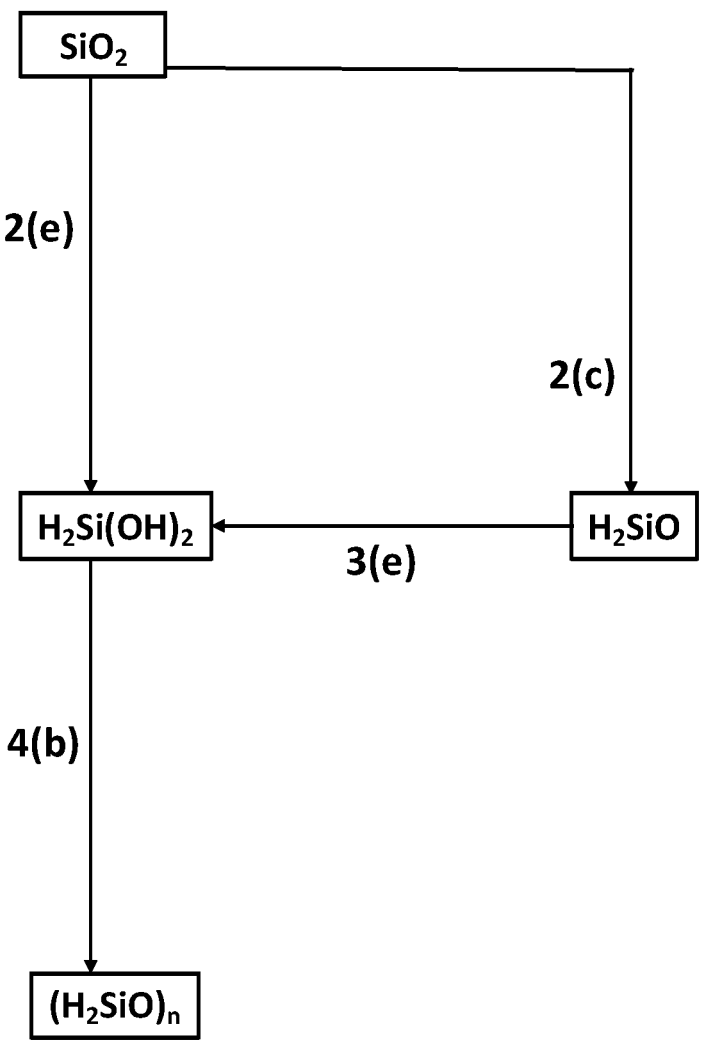
FIG. 3 illustrates another example of process steps.

In an embodiment of the present invention, which is illustrated in FIG. 3, the process for the production or regeneration of a liquid siloxane hydrogen carrier compound comprises the following consecutive steps:

either subjecting the silica compound and/or silicate compound to a hydrogenation/dehydration step 2(c) to produce silanone (H$_2$SiO), and subjecting said silanone (H$_2$SiO) obtained from step 2(c) to a hydration step 3(e) to produce dihydroxysilane (H$_2$Si(OH)$_2$), or subjecting the silica compound and/or silicate compound to a semi-hydrogenation step 2(e) to produce dihydroxysilane (H$_2$Si(OH)$_2$), then subjecting dihydroxysilane (H$_2$Si(OH)$_2$) obtained from steps 2(e) or 3(e) to a polycondensation step 4(b) to produce or regenerate the said liquid siloxane hydrogen carrier compound.

In an embodiment of the present invention, the process for the production or regeneration of a liquid siloxane hydrogen carrier compound comprises the following consecutive steps:

subjecting the silica compound and/or silicate compound to a hydrogenation/dehydration step 2(c) to produce silanone (H$_2$SiO), and subjecting said silanone (H$_2$SiO) obtained from step 2(c) to a polyaddition (polymerisation) step 4(a) to produce or regenerate the said liquid siloxane hydrogen carrier compound.

Figure 4:
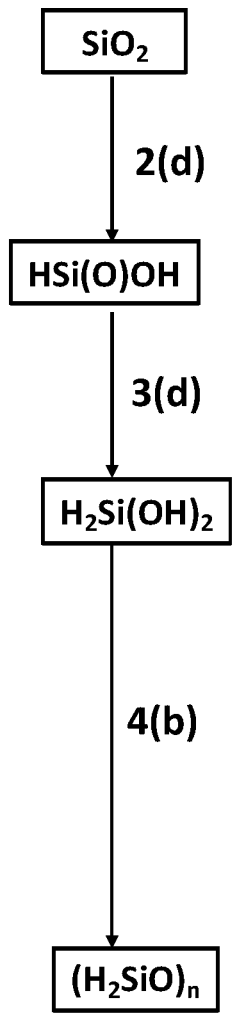
FIG. 4 illustrates another example of process steps.

In an embodiment of the present invention, which is illustrated in FIG. 4, the process for the production or regeneration of a liquid siloxane hydrogen carrier compound comprises the following consecutive steps:

subjecting the silica compound and/or silicate compound to a partial hydrogenation step 2(d) to produce formosilicic acid (HSi(O)(OH)), then subjecting formosilicic acid (HSi(O)(OH)) obtained from steps 2(d) to a hydrogenation step 3(d) to produce dihydroxysilane (H$_2$Si(OH)$_2$), then subjecting dihydroxysilane (H$_2$Si(OH)$_2$) obtained from step 3(d) to a polycondensation step 4(b) to produce or regenerate the said liquid siloxane hydrogen carrier compound.

Figure 5:
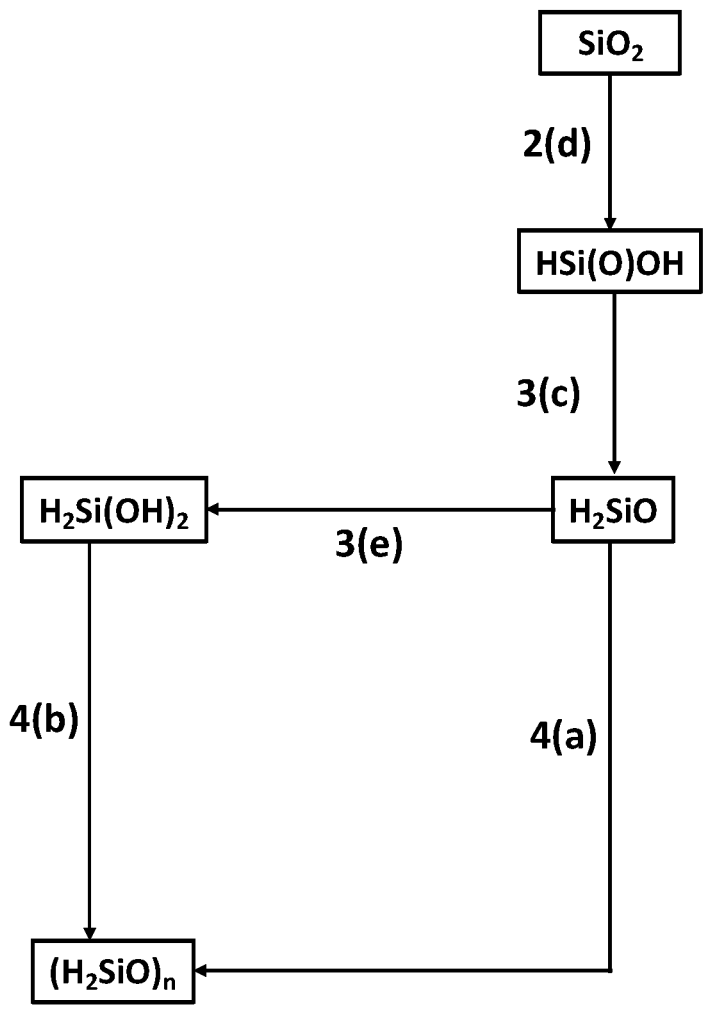
FIG. 5 illustrates another example of process steps.

In an embodiment of the present invention, which is illustrated in FIG. 5, the process for the production or regeneration of a liquid siloxane hydrogen carrier compound comprises the following consecutive steps:

subjecting the silica compound and/or silicate compound to a partial hydrogenation step 2(d) to produce formosilicic acid (HSi(O)(OH)), then subjecting formosilicic acid (HSi(O)(OH)) obtained from step 2(d) to a hydrogenation and dehydration step 3(c) to produce silanone (H$_2$SiO), then either subjecting silanone (H$_2$SiO) obtained from step 3(c) to a polyaddition step 4(a) to produce or regenerate the said liquid siloxane hydrogen carrier compound, or subjecting silanone (H$_2$SiO) obtained from step 3(c) to a hydration step 3(e) to produce dihydroxysilane (H$_2$Si(OH)$_2$) and subjecting said dihydroxysilane (H$_2$Si(OH)$_2$) obtained from step 3(e) to a polycondensation step 4(b) to produce or regenerate the said liquid siloxane hydrogen carrier compound.

In an embodiment of the present invention, which is illustrated in FIG. 6, the process for the production or regeneration of a liquid siloxane hydrogen carrier compound comprises the following consecutive steps:

either subjecting the silica compound and/or silicate compound to a reduction step 2(a) to produce silicon monoxide (SiO), or subjecting the silica compound and/or silicate compound to a elemental silicon-mediated disproportionation step 2(b) to produce silicon monoxide (SiO), then
subjecting silicon monoxide (SiO) obtained from steps 2(a) or 2(b) to a hydrogenation step 3(a) to produce silanone ($H_2SiO$),
then
subjecting silanone ($H_2SiO$) obtained from step 3(a) to a hydration step 3(e) to produce dihydroxysilane ($H_2Si(OH)_2$) and subjecting said dihydroxysilane ($H_2Si(OH)_2$) obtained from step 3(e) to a polycondensation step 4(b) to produce or regenerate the said liquid siloxane hydrogen carrier compound.

In an embodiment of the present invention, which is illustrated in FIG. 7, the process for the production or regeneration of a liquid siloxane hydrogen carrier compound comprises the following consecutive steps:
either subjecting the silica compound and/or silicate compound to a reduction step 2(a) to produce silicon monoxide (SiO), or
subjecting the silica compound and/or silicate compound to a elemental silicon-mediated disproportionation step 2(b) to produce silicon monoxide (SiO),
then
subjecting silicon monoxide (SiO) obtained from steps 2(a) or 2(b) to a hydration step 3(b) to produce formosilicic acid (HSi(O)(OH)),
then
subjecting formosilicic acid (HSi(O)(OH)) obtained from steps 3(b) to a hydrogenation step 3(d) to produce dihydroxysilane ($H_2Si(OH)_2$) and subjecting said dihydroxysilane ($H_2Si(OH)_2$) obtained from step 3(d) to a polycondensation step 4(b) to produce or regenerate the said liquid siloxane hydrogen carrier compound.

Figure 8:
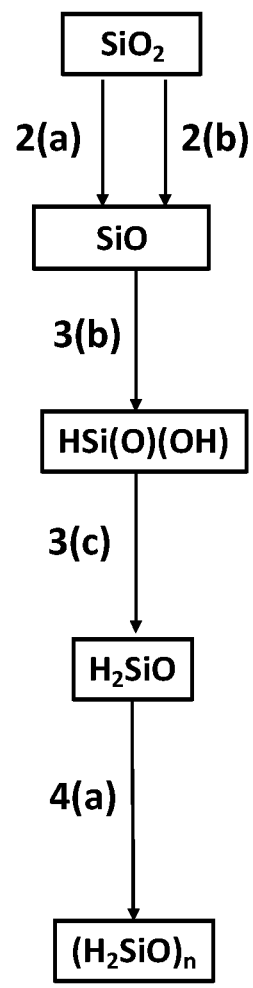
FIG. 8 illustrates another example of process steps.

In an embodiment of the present invention, which is illustrated in FIG. 8, the process for the production or regeneration of a liquid siloxane hydrogen carrier compound comprises the following consecutive steps:
either subjecting the silica compound and/or silicate compound to a reduction step 2(a) to produce silicon monoxide (SiO), or
subjecting the silica compound and/or silicate compound to a elemental silicon-mediated disproportionation step 2(b) to produce silicon monoxide (SiO),
then
subjecting silicon monoxide (SiO) obtained from steps 2(a) or 2(b) to a hydration step 3(b) to produce formosilicic acid (HSi(O)(OH)),
then
subjecting formosilicic acid (HSi(O)(OH)) obtained from steps 3(b) to a hydrogenation and dehydration step 3(c) to produce silanone ($H_2SiO$) and subjecting said silanone ($H_2SiO$) obtained from step 3(c) to a polyaddition step 4(a) to produce or regenerate the said liquid siloxane hydrogen carrier compound.

Step 2(a)—Reduction of Silica/Silicate Type Products to Form Silicon Monoxide (SiO)

Any appropriate method can be used for the reduction of silica/silicate type products to form silicon monoxide (SiO). In an embodiment according to the present invention, said reduction is performed in one stage. In an embodiment according to the present invention, said reduction is performed at high temperatures, for example above 1500° C.

For example, in an embodiment according to the present invention, the silica/silicate compound is reduced in the presence of hydrogen gas for the production of SiO as exemplified by the following equation: $SiO_2+H_2->SiO+H_2O$ Other gas(es) can optionally be employed in addition to hydrogen, e.g. an inert gas such as argon or nitrogen. The reaction can be performed either with both reactants in the gas phase, in a plasma jet for example, or in a heterogeneous manner by reacting the solid silica/silicate compound with hydrogen gas, in a fluidised bed reactor for example.

Reaction in the gas phase is preferred. The $H_2/SiO_2$ molar ratio is preferably comprised between 0.1 and 1000, for example between 1 and 50. A heat source is preferably used; any source of heat can be selected, e.g. hot oil, steam, electric arc technology, induction heating, microwave, hot filament, plasma technology. In an embodiment, a cooling source may be used too to trap desired species; any appropriate cooling source can be selected e.g. water cooler, oil cooler, brine cooler, special heat exchanger . . . . Heat may advantageously be recovered to heat up reactors from other steps, and/or to heat up plant facilities, and/or to produce electricity etc. . . . . In addition to the main reaction according to this step 2(a) which leads to compound SiO, other compounds may also be produced, e.g. $H_2SiO$, and/or HSi(O)(OH), and/or $H_2Si(OH)_2$, and/or $SiH_4$, and/or Si; the production of Si is considered as a side reaction, i.e. represented by the full reduction reaction leading to elemental silicon, as exemplified by the following equation: $SiO_2+2 H_2->Si+2H_2O$. Said Si, when produced, can advantageously be used in the following disproportionation step 2(b).

Step 2(b)—Elemental Silicon Mediated Disproportionation of Silica/Silicate Type Products to Form Silicon Monoxide (SiO)

Any appropriate method can be used for the disproportionation step 2(b) to produce SiO. For example, in an embodiment according to the present invention, the step 2(b) consists in the reduction of the silica/silicate compound in the presence of elemental silicon for the production of SiO as exemplified by the following equation: $SiO_2+Si->2\ SiO$.

The $Si/SiO_2$ molar ratio is preferably comprised between 0.5 and 1.5, for example between 0.9 and 1.1. Any source of elemental silicon can be used, e.g. metallurgical, photovoltaic or electronic grade silicon. In an embodiment according to the present invention, elemental silicon is preferably produced by full reduction of the silica/silicate compound by hydrogen as exemplified by the following equation: $SiO_2+2 H_2->Si$.

In an embodiment according to the present invention, a catalyst may be added to the $SiO_2/Si$ mixture in order to facilitate the said disproportionation. Any appropriate catalyst can be used to facilitate the said disproportionation, for example a metal, an ore or an organic compound.

In an embodiment according to the present invention, an additive may be added to the $SiO_2/Si$ mixture in order to facilitate the said disproportionation. For example, organic binders, fillers etc. . . . can be used. In an embodiment according to the present invention, said disproportionation is performed at high temperatures, for example above 1500° C.

In an embodiment according to the present invention, said disproportionation is performed under reducing atmosphere, for example in the presence of hydrogen gas.

Other gas(es) can optionally be employed, e.g. an inert gas such as argon or nitrogen. Since this reaction is endothermic, a heat source is preferably used; any source of heat can be selected, e.g. hot oil, steam, electric arc technology, induction heating, microwave, hot filament, plasma technology.

Step 2(c)—Hydrogenation and Dehydration of Silica/Silicate Type Products to Form Silanone ($H_2SiO$)

Any appropriate method can be used for the hydrogenation and dehydration of step 2(c) to produce $H_2SiO$. For example, in an embodiment according to the present invention, the step 2(c) consists in the addition of hydrogen gas and deoxygenation of the silica/silicate compound for the production of $H_2SiO$ as exemplified by the following equation: $SiO_2 + 2 H_2 \rightarrow H_2SiO + H_2O$. The $H_2/SiO_2$ molar ratio is preferably comprised between 0.1 and 1000, for example between 1 and 50, for example between 2 and 50. In an embodiment according to the present invention, said hydrogenation is performed at high temperature, for example above 1500° C. In an embodiment according to the present invention, a catalyst may be used to enhance the performances of the said hydrogenation, for example a metal, a metal immobilized on a support, an ore or an organic compound.

Other gas(es) can optionally be employed, e.g. an inert gas such as argon or nitrogen. Since this reaction is endothermic, a heat source is preferably used; any source of heat can be selected, e.g. hot oil, steam, electric arc technology, induction heating, microwave, hot filament, plasma technology. The hydrogenation/dehydration reaction of silica/silicate compounds by hydrogen gas produces water as by-product. The formed water may advantageously be removed continuously from the reaction area. The formed water can advantageously be used as chemical reactant of other steps, e.g. steps 3(b), 3(e) and/or 3(f), and/or as heating source for other utilities and/or can be transformed in an electrolyser to reform hydrogen gas and/or can be used to run a steam turbine to produce electricity. $H_2SiO$ species may advantageously be isolated at a low temperature, for example a sub-zero Celsius degree temperature. $H_2SiO$ species can be in equilibrium with other species, e.g. HSi(OH) cis and trans isomers. In addition to the main reaction according to this step 2(c) which leads to compound $H_2SiO$, other compounds may also be produced, e.g. SiO, and/or HSi(O)(OH), and/or $H_2Si(OH)_2$, and/or $SiH_4$, and/or Si; said Si, when produced, can advantageously be used in the previous disproportionation step 2(b).

Step 2(d)—Partial Hydrogenation of Silica/Silicate Type Products to Form Formosilicic Acid (HSi(O)(OH))

Any appropriate method can be used for the partial hydrogenation of step 2(d) to produce (HSi(O)(OH)). For example, in an embodiment according to the present invention, the step 2(d) consists in the addition of hydrogen gas onto the silica/silicate compound for the production of (HSi(O)(OH)) as exemplified by the following equation: $SiO_2 + H_2 \rightarrow HSi(O)(OH)$. The $H_2/SiO_2$ molar ratio is preferably comprised between 0.1 and 1000, for example between 1 and 50. In an embodiment according to the present invention, said hydrogenation is performed at high temperature, for example above 1500° C. In an embodiment according to the present invention, a catalyst may be used to enhance the performances of the said hydrogenation, for example a metal, a metal immobilized on a support, an ore or an organic compound.

Other gas(es) can optionally be employed, e.g. an inert gas such as argon or nitrogen. Since this reaction is endothermic, a heat source is preferably used; any source of heat can be selected, e.g. hot oil, steam, electric arc technology, induction heating, microwave, hot filament, plasma technology. (HSi(O)(OH)) species may advantageously be isolated at a low temperature, for example a sub-zero Celsius degree temperature.

In addition to the main reaction according to this step 2(d) which leads to compound HSi(O)(OH), other compounds may also be produced, e.g. SiO, and/or $H_2SiO$, and/or $H_2Si(OH)_2$, and/or $SiH_4$, and/or Si; said Si, when produced, can advantageously be used in the previous disproportionation step 2(b).

Step 2(e)—Semi-Hydrogenation of Silica/Silicate Type Products to Form Dihydroxisilane ($H_2Si(OH)_2$)

Any appropriate method can be used for the hydrogenation (i.e. semi-hydrogenation) of step 2(e) to produce ($H_2Si(OH)_2$). For example, in an embodiment according to the present invention, the step 2(e) consists in the hydrogenation of the silica/silicate compound by hydrogen gas for the production of ($H_2Si(OH)_2$) as exemplified by the following equation: $SiO_2 + 2 H_2 \rightarrow H_2Si(OH)_2$. The $H_2/SiO_2$ molar ratio is preferably comprised between 0.1 and 1000, for example between 1 and 50, for example between 2 and 50. In an embodiment according to the present invention, said hydrogenation is performed at high temperature, for example above 1500° C. In an embodiment according to the present invention, a catalyst may be used to enhance the performances of the said hydrogenation, for example a metal, a metal immobilized on a support, an ore or an organic compound.

Other gas(es) can optionally be employed, e.g. an inert gas such as argon or nitrogen. Since this reaction is endothermic, a heat source is preferably used; any source of heat can be selected, e.g. hot oil, steam, electric arc technology, induction heating, microwave, hot filament, plasma technology.

In addition to the main reaction according to this step 2(e) which leads to compound $H_2Si(OH)_2$, other compounds may also be produced, e.g. SiO, and/or $H_2SiO$, and/or HSi(O)(OH), and/or $SiH_4$, and/or Si; said Si, when produced, can advantageously be used in the previous disproportionation step 2(b).

Step 2(f)—Full Hydrogenation of Silica/Silicate Type Products to Form Silane ($SiH_4$)

Any appropriate method can be used for the full hydrogenation of step 2(f) to produce ($SiH_4$). For example, in an embodiment according to the present invention, the step 2(1) consists in the hydrogen gas-assisted deoxygenation of the silica/silicate compound for the production of $SiH_4$ as exemplified by the following equation:

$SiO_2 + 4 H_2 \rightarrow SiH_4 + 2 H_2O$. The formed water may advantageously be removed continuously from the reaction area. The formed water can advantageously be used as chemical reactant of other steps, e.g. steps 3(b), 3(e) and/or 3(f), and/or as heating source for other utilities and/or can be transformed in an electrolyser to reform hydrogen gas and/or can be used to run a steam turbine to produce electricity.

The $H_2/SiO_2$ molar ratio is preferably comprised between 0.1 and 1000, for example between 4 and 50. In an embodiment according to the present invention, a catalyst may be used to enhance the performances of the said hydrogenation, for example a metal, a metal immobilized on a support, an ore or an organic compound. Other gas(es) can optionally be employed, e.g. an inert gas such as argon or nitrogen. Since this reaction is endothermic, a heat source is preferably used; any source of heat can be selected, e.g. hot oil, steam, electric arc technology, induction heating, microwave, hot filament, plasma technology. In an embodiment according to the present invention, an excitation of the silica/silicate type products in the form of an electric field may be applied to facilitate the hydrogenation. In an embodiment according to the present invention, a catalyst may be used to enhance the performances of the said hydrogenation, for example a metal, a metal immobilized on a support, an ore or an organic compound. In addition to the main reaction according to this step 2(f) which leads to compound $SiH_4$, other compounds may also be produced, e.g. SiO, and/or $H_2SiO$, and/or $HSi(O)(OH)$, and/or $H_2Si(OH)_2$, and/or Si; said Si, when produced, can advantageously be used in the previous disproportionation step 2(b).

Step 3(a)—Hydrogenation of SiO to Form Silanone ($H_2SiO$)

Any appropriate method can be used for the hydrogenation step 3(a) to produce $H_2SiO$. For example, in an embodiment according to the present invention, the step 3(a) consists in the oxidative addition of hydrogen gas onto SiO for the production of $H_2SiO$ as exemplified by the following equation $SiO+H_2->H_2SiO$. In an embodiment according to the present invention, the reaction is performed in the gas phase. The $H_2/SiO$ molar ratio is preferably comprised between 0.1 and 1000, for example between 1 and 50. In an embodiment according to the present invention, a catalyst may be used to enhance the performances of the said hydrogenation, for example a metal, a metal immobilized on a support, an ore or an organic compound. Other gas(es) can optionally be employed, e.g. an inert gas such as argon or nitrogen. $H_2SiO$ species can be in equilibrium with other species, e.g. HSi(OH) cis and trans isomers. In addition to the main reaction according to this step 3(a) which leads to compound $H_2SiO$, other compounds may also be produced, e.g. $SiH_4$ and/or Si; said Si, when produced, can advantageously be used in the previous disproportionation step 2(b).

Step 3(b)—Hydration of SiO to Form Formosilicic Acid (HSi(O)(OH))

Any appropriate method can be used for the hydrolysis step 3(b) to produce HSi(O)(OH). For example, in an embodiment according to the present invention, the step 3(b) consists in the oxidative addition of water onto SiO for the production of HSi(O)(OH) as exemplified by the following equation $SiO+H_2O->HSi(O)(OH)$. In an embodiment according to the present invention, the reaction is performed in the gas phase. The $H_2O/SiO$ molar ratio is preferably comprised between 0.1 and 1000, for example between 1 and 50. In an embodiment according to the present invention, a catalyst may be used to enhance the performances of the said hydration, for example a metal, a metal immobilized on a support, an ore or an organic compound. Other gas(es) can optionally be employed, e.g. an inert gas such as argon or nitrogen or hydrogen. In addition to the main reaction according to this step 3(b) which leads to compound HSi(O)(OH), other compounds may also be produced, e.g. $SiO_2$; said $SiO_2$, when produced, can advantageously be used in the previous steps 2(a), 2(b), 2(c), 2(d), 2(e) and/or 2(f).

Step 3(c)—Formosilicic Acid (HSi(O)(OH)) Hydrogenation and Dehydration Step 3(c) to Produce Silanone ($H_2SiO$)

Any appropriate method can be used for the hydrogenation and dehydration step 3(c) to produce $H_2SiO$. For example, in an embodiment according to the present invention, the step 3(c) consists in the addition of hydrogen gas onto formosilicic acid and deoxygenation by hydrogen gas of formosilicic acid (HSi(O)(OH)) for the production of $H_2SiO$ as exemplified by the following equation $HSi(O)(OH)+H_2->H_2SiO+H_2O$. The formed water may advantageously be removed continuously from the reaction area. The formed water can advantageously be used as chemical reactant of other steps, e.g. steps 3(b), 3(e) and/or 3(f), and/or as heating source for other utilities and/or can be transformed in an electrolyser to reform hydrogen gas and/or can be used to run a steam turbine to produce electricity. In an embodiment according to the present invention, the reaction is performed in the gas phase.

The $H_2/HSi(O)(OH)$ molar ratio is preferably comprised between 0.1 and 1000, for example between 1 and 50. In an embodiment according to the present invention, a catalyst may be used to enhance the performances of the said hydrogenation, for example a metal, a metal immobilized on a support, an ore or an organic compound. Other gas(es) can optionally be employed, e.g. an inert gas such as argon or nitrogen. In addition to the main reaction according to this step 3(c) which leads to compound $H_2SiO$, other compounds may also be produced, e.g. $SiH_4$ and/or $H_2Si(OH)_2$ and/or Si; said Si, when produced, can advantageously be used in the previous disproportionation step 2(b).

Step 3(d)—Formosilicic Acid (HSi(O)(OH)) Hydrogenation Step 3(d) to Produce Dihydroxysilane ($H_2Si(OH)_2$)

Any appropriate method can be used for the hydrogenation step 3(d) to produce $H_2Si(OH)_2$. For example, in an embodiment according to the present invention, the step 3(d) consists in the addition of hydrogen gas onto formosilicic acid (HSi(O)(OH)) for the production of $H_2Si(OH)_2$ as exemplified by the following equation $HSi(O)(OH)+H_2->H_2Si(OH)_2$. In an embodiment according to the present invention, the reaction is performed in the gas phase. The $H_2/HSi(O)(OH)$ molar ratio is preferably comprised between 0.1 and 1000, for example between 1 and 50. In an embodiment according to the present invention, a catalyst may be used to enhance the performances of the said hydrogenation, for example a metal, a metal immobilized on a support, an ore or an organic compound. Other gas(es) can optionally be employed, e.g. an inert gas such as argon or nitrogen. In addition to the main reaction according to this step 3(d) which leads to compound $H_2Si(OH)_2$, other compounds may also be produced, e.g. $SiH_4$ and/or Si; said Si, when produced, can advantageously be used in the previous disproportionation step 2(b).

Step 3(e)—Silanone ($H_2SiO$) Hydration Step 3(e) to Produce Dihydroxysilane ($H_2Si(OH)_2$)

Any appropriate method can be used for the hydration step 3(e) to produce $H_2Si(OH)_2$. For example, in an embodiment according to the present invention, the step 3(e) consists in the addition of water onto silanone ($H_2SiO$) for the production of $H_2Si(OH)_2$ as exemplified by the following equation $H_2SiO+H_2O->H_2Si(OH)_2$. In an embodiment according to the present invention, the reaction is performed in the gas phase. The $H_2O/H_2SiO$ molar ratio is preferably comprised between 0.1 and 1000, for example between 0.5 and 50, for example between 1 and 50. Other gas(es) can optionally be employed, e.g. an inert gas such as argon or nitrogen or hydrogen.

Step 3(f)—Silane ($SiH_4$) Partial Hydrolysis Step 3(f) to Produce Dihydroxysilane ($H_2Si(OH)_2$)

Any appropriate method can be used for the hydrolysis step 3(f) to produce $H_2Si(OH)_2$. For example, in an embodiment according to the present invention, the step 3(e) consists in the partial hydrolysis of silane ($SiH_4$) for the production of $H_2Si(OH)_2$ as exemplified by the following equation $SiH_4+2\ H_2O->H_2Si(OH)_2+2\ H_2$. The $H_2O/SiH_4$ molar ratio is preferably comprised between 0.1 and 1000, for example between 2 and 50. Other gas(es) can optionally be employed, e.g. an inert gas such as argon or nitrogen. In addition to the main reaction according to this step 3(f) which leads to compound $H_2Si(OH)_2$, other compounds may also be produced, e.g. $SiO_2$; said $SiO_2$, when produced, can advantageously be used in the previous steps 2(a), 2(b), 2(c), 2(d), 2(e) and/or 2(f).

Step 4(a)—Production/Regeneration of the Siloxane Hydrogen Carrier Compounds from $H_2SiO$ Any appropriate method can be used for the Production/Regeneration of the siloxane hydrogen carrier compounds from $H_2SiO$. In an embodiment according to the present invention, there is provided a process for the polymerisation (polyaddition) of $H_2SiO$ to produce/regenerate the siloxane hydrogen carrier compounds. As the reaction may be exothermic, a cooling source may advantageously be used; any source can be selected e.g. water cooler, oil cooler, brine cooler, special heat exchanger . . . ; the heat recovered may advantageously be recovered to heat up reactors from other steps, and/or to heat up plant facilities, and/or to produce electricity etc. . . . .

Step 4(b)—Production/Regeneration of the Siloxane Hydrogen Carrier Compounds from $H_2Si(OH)_2$ In an embodiment according to the present invention, there is provided a process for the polycondensation of $H_2Si(OH)_2$ to produce/regenerate the siloxane hydrogen carrier compounds. The polycondensation reaction will produce water as by-product. The formed water may advantageously be removed continuously from the reaction area. The formed water can advantageously be used as chemical reactant of previous step(s), e.g. steps 3(b), 3(e) and/or 3(f) and/or can be transformed in an electrolyser to reform hydrogen gas for example. As the reaction may be exothermic, a cooling source may advantageously be used; any cooling source can be selected e.g. water cooler, oil cooler, brine cooler, special heat exchanger . . . ; the heat recovered may advantageously be recovered to heat up reactors from other steps, and/or to heat up plant facilities, and/or to produce electricity etc. . . . .

Step 4(c)—Production/Regeneration of the Siloxane Hydrogen Carrier Compounds from $SiH_4$.

In an embodiment according to the present invention, there is provided a process for the oxygen-mediated partial oxidation of silane to produce/regenerate the siloxane hydrogen carrier compounds. The reaction will produce water as by-product. The formed water may advantageously be removed continuously from the reaction area. The formed water can advantageously be used as chemical reactant of previous steps, e.g. steps 3(b), 3(e) and/or 3(f) and/or can be transformed in an electrolyser to reform hydrogen gas for example. As the reaction may be exothermic, a cooling source may advantageously be used; any cooling source can be selected e.g. water cooler, oil cooler, brine cooler, special heat exchanger . . . ; the heat recovered may advantageously be recovered to heat up reactors from other steps, and/or to heat up plant facilities, and/or to produce electricity etc. . . . . In addition to the main reaction according to this step 4(c) which leads to the siloxane hydrogen carrier compounds, other compounds may also be produced, e.g. $SiO_2$; said $SiO_2$, when produced, can advantageously be used in the previous steps 2(a), 2(b), 2(c), 2(d), 2(e) and/or 2(f). Final treating steps can advantageously be performed such as washings with a solvent, gas stripping, drying or distillation steps etc. . . . .

In an embodiment according to the present invention, the energy consumption required by the overall siloxane hydrogen carrier of formula (I) and/or formula (II) production process may be comprised between 1 and 200 kWh/kg of produced siloxane, for example between 1 and 35 kWh/kg of produced siloxane.

In an embodiment according to the present invention, the energy consumption required by the overall siloxane hydrogen carrier of formula (I) and/or formula (II) regeneration process may be comprised between 1 and 2000 kWh/kg of liberated $H_2$, for example between 1 and 400 kWh/kg of liberated $H_2$.

The following terms and expressions contained herein are defined as follows:
hydrogen carriers are either solid-state or liquid-state materials that contain hydrogen atoms, readily releasable as molecular dihydrogen ($H_2$) when needed.

It should be obvious to those skilled in the art that the present invention enables embodiments under numerous other specific forms without leaving the field of application of the invention as claimed. Consequently, the present embodiments must be considered as illustrations, but may be modified in the defined field by the scope of the attached claims, and the invention must not be limited to the details given above.

The invention claimed is:

1. A process for the production of a liquid siloxane hydrogen carrier compound,
said process comprising the following consecutive steps:
providing a silica compound and/or a silicate compound,
either subjecting the silica compound and/or silicate compound to a reduction step 2(a) to produce silicon monoxide (SiO), or
subjecting the silica compound and/or silicate compound to an elemental silicon- mediated disproportionation step 2(b) to produce silicon monoxide (SiO), or
subjecting the silica compound and/or silicate compound to a hydrogenation/dehydration step 2(c) to produce silanone ($H_2SiO$), or
subjecting the silica compound and/or silicate compound to a partial hydrogenation step 2(d) to produce formosilicic acid (HSi(O)(OH)), or
subjecting the silica compound and/or silicate compound to a semi-hydrogenation step 2(e) to produce dihydroxysilane ($H_2Si(OH)_2$), or
subjecting the silica compound and/or silicate compound to a full hydrogenation step 2(f) to produce silane ($SiH_4$),
then
subjecting silicon monoxide (SiO) obtained from step 2(a) or 2(b) to a hydrogenation step 3(a) to produce silanone ($H_2SiO$), or
subjecting silicon monoxide (SiO) obtained from steps 2(a) and/or 2(b) to a hydration step 3(b) to produce formosilicic acid (HSi(O)(OH)), and/or
subjecting formosilicic acid (HSi(O)(OH)) obtained from steps 2(d) and/or 3(b) to a hydrogenation and dehydration step 3(c) to produce silanone ($H_2SiO$), and/or
subjecting formosilicic acid (HSi(O)(OH)) obtained from steps 2(d) and/or 3(b) to a hydrogenation step 3(d) to produce dihydroxysilane ($H_2Si(OH)_2$), and/or
subjecting silanone ($H_2SiO$) obtained from steps 2(c) and/or 3(a) and/or 3(c) to a hydration step 3(e) to produce dihydroxysilane ($H_2Si(OH)_2$), or
subjecting silane ($SiH_4$) obtained from step 2(f) to a partial hydrolysis step 3(f) to produce dihydroxysilane ($H_2Si(OH)_2$), or
proceeding directly to the next step with the dihydroxysilane ($H_2Si(OH)_2$) obtained from step 2(e), or
proceeding directly to the next step with the silanone ($H_2SiO$) obtained from step 2(c), or
proceeding directly to the next step with the silane ($SiH_4$) obtained from step 2(f),
then subjecting silanone ($H_2SiO$) obtained from steps 2(c) and/or 3(a) and/or 3(c) to a polyaddition step 4(a) to produce the said liquid siloxane hydrogen carrier compound, or subjecting dihydroxysilane ($H_2Si(OH)_2$) obtained from steps 2(e) and/or 3(d) and/or 3(e) and/or 3(f) to a polycondensation step 4(b) to produce the said liquid siloxane hydrogen carrier compound, or subjecting silane ($SiH_4$) obtained from step 2(f) to an oxygen-mediated partial oxidation step 4(c) to produce the said liquid siloxane hydrogen carrier compound.

2. A process for the regeneration of a liquid siloxane hydrogen carrier compound wherein a liquid siloxane hydrogen carrier compound is subjected to hydrolytic oxidation for the production of hydrogen and silica and/or silicate compound (B) followed by the process according to claim 1 to regenerate a liquid siloxane hydrogen carrier compound.

3. The process for the regeneration of a liquid siloxane hydrogen carrier compound according to claim 2 wherein the regenerated siloxane hydrogen carrier compound is chemically identical to the siloxane hydrogen carrier compound subjected to hydrolytic oxidation.

4. The process for the production of a liquid siloxane hydrogen carrier compound according to claim 1 comprising the following consecutive steps:

either subjecting the silica compound and/or silicate compound to a reduction step 2(a) to produce silicon monoxide (SiO), or subjecting the silica compound and/or silicate compound to an elemental silicon-mediated disproportionation step 2(b) to produce silicon monoxide (SiO), then subjecting silicon monoxide (SiO) obtained from steps 2(a) or 2(b) to a hydrogenation step 3(a) to produce silanone ($H_2SiO$), then subjecting silanone ($H_2SiO$) obtained from step 3(a) to a polyaddition step 4(a) to produce the said liquid siloxane hydrogen carrier compound.

5. The process for the production of a liquid siloxane hydrogen carrier compound according to claim 1 comprising the following consecutive steps:

either subjecting the silica compound and/or silicate compound to a hydrogenation/dehydration step 2(c) to produce silanone ($H_2SiO$), and subjecting said silanone ($H_2SiO$) obtained from step 2(c) to a hydration step 3(e) to produce dihydroxysilane ($H_2Si(OH)_2$), or subjecting the silica compound and/or silicate compound to a semi-hydrogenation step 2(e) to produce dihydroxysilane ($H_2Si(OH)_2$), then subjecting dihydroxysilane ($H_2Si(OH)_2$) obtained from steps 2(e) or 3(e) to a polycondensation step 4(b) to produce the said liquid siloxane hydrogen carrier compound.

6. The process for the production of a liquid siloxane hydrogen carrier compound according to claim 1 comprising the following consecutive steps:

subjecting the silica compound and/or silicate compound to a hydrogenation/dehydration step 2(c) to produce silanone ($H_2SiO$), and subjecting said silanone ($H_2SiO$) obtained from step 2(c) to a polyaddition step 4(a) to produce or regenerate the said liquid siloxane hydrogen carrier compound.

7. The process for the production of a liquid siloxane hydrogen carrier compound according to claim 1 comprising the following consecutive steps:

subjecting the silica compound and/or silicate compound to a partial hydrogenation step 2(d) to produce formosilicic acid (HSi(O)(OH)), then subjecting formosilicic acid (HSi(O)(OH)) obtained from steps 2(d) to a hydrogenation step 3(d) to produce dihydroxysilane ($H_2Si(OH)_2$), then subjecting dihydroxysilane ($H_2Si(OH)_2$) obtained from step 3(d) to a polycondensation step 4(b) to produce the said liquid siloxane hydrogen carrier compound.

8. The process for the production of a liquid siloxane hydrogen carrier compound according to claim 1 comprising the following consecutive steps:

subjecting the silica compound and/or silicate compound to a partial hydrogenation step 2(d) to produce formosilicic acid (HSi(O)(OH)), then subjecting formosilicic acid (HSi(O)(OH)) obtained from step 2(d) to a hydrogenation and dehydration step 3(c) to produce silanone ($H_2SiO$), then either subjecting silanone ($H_2SiO$) obtained from step 3(c) to a polyaddition step 4(a) to produce or regenerate the said liquid siloxane hydrogen carrier compound, or subjecting silanone ($H_2SiO$) obtained from step 3(c) to a hydration step 3(e) to produce dihydroxysilane ($H_2Si(OH)_2$) and subjecting said dihydroxysilane ($H_2Si(OH)_2$) obtained from step 3(e) to a polycondensation step 4(b) to produce the said liquid siloxane hydrogen carrier compound.

9. The process for the production of a liquid siloxane hydrogen carrier compound according to claim 1 comprising the following consecutive steps:

either subjecting the silica compound and/or silicate compound to a reduction step 2(a) to produce silicon monoxide (SiO), or subjecting the silica compound and/or silicate compound to an elemental silicon-mediated disproportionation step 2(b) to produce silicon monoxide (SiO), then subjecting silicon monoxide (SiO) obtained from steps 2(a) or 2(b) to a hydrogenation step 3(a) to produce silanone ($H_2SiO$), then subjecting silanone ($H_2SiO$) obtained from step 3(a) to a hydration step 3(e) to produce dihydroxysilane ($H_2Si(OH)_2$) and subjecting said dihydroxysilane ($H_2Si(OH)_2$) obtained from step 3(e) to a polycondensation step 4(b) to produce the said liquid siloxane hydrogen carrier compound.

10. The process for the production of a liquid siloxane hydrogen carrier compound according to claim 1 comprising the following consecutive steps:

either subjecting the silica compound and/or silicate compound to a reduction step 2(a) to produce silicon monoxide (SiO), or subjecting the silica compound and/or silicate compound to an elemental silicon-mediated disproportionation step 2(b) to produce silicon monoxide (SiO), then subjecting silicon monoxide (SiO) obtained from steps 2(a) or 2(b) to a hydration step 3(b) to produce formosilicic acid (HSi(O)(OH)), then subjecting formosilicic acid (HSi(O)(OH)) obtained from steps 3(b) to a hydrogenation step 3(d) to produce dihydroxysilane (H₂Si(OH)₂) and subjecting said dihydroxysilane (H₂Si(OH)₂) obtained from step 3(d) to a polycondensation step 4(b) to produce the said liquid siloxane hydrogen carrier compound.

11. The process for the production of a liquid siloxane hydrogen carrier compound according to claim 1 comprising the following consecutive steps:

either subjecting the silica compound and/or silicate compound to a reduction step 2(a) to produce silicon monoxide (SiO), or subjecting the silica compound and/or silicate compound to an elemental silicon-mediated disproportionation step 2(b) to produce silicon monoxide (SiO), then subjecting silicon monoxide (SiO) obtained from steps 2(a) or 2(b) to a hydration step 3(b) to produce formosilicic acid (HSi(O)(OH)), then subjecting formosilicic acid (HSi(O)(OH)) obtained from steps 3(b) to a hydrogenation and dehydration step 3(c) to produce silanone (H₂SiO) and subjecting said silanone (H₂SiO) obtained from step 3(c) to a polyaddition step 4(a) to produce the said liquid siloxane hydrogen carrier compound.

12. The process for the production of a liquid siloxane hydrogen carrier compound according to claim 1 wherein the liquid siloxane hydrogen carrier compound is selected from (I) liquid linear siloxane hydrogen carrier compounds of formula (I):

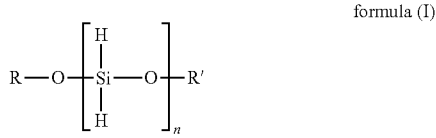

formula (I)

wherein n is an integer (representing the number of repeating units) superior or equal to one and wherein radicals R and R' don't contain carbon and wherein R and R' comprises Si and hydrogen and/or oxygen, and (II) cyclic siloxane compounds having the formula (II)

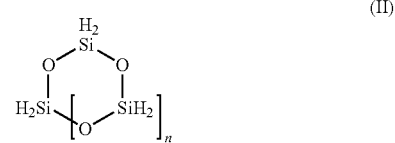

(II)

wherein n is an integer (representing the number of repeating units H₂SiO) superior or equal to one.

13. The process according to claim 12 wherein, in formula (I), n is superior or equal to 2.

14. The process according to claim 12 wherein, in formula (I), n is superior or equal to 2 and wherein the carbon-free R and R' radicals of formula (I) are selected from —SiH₃, —SiH₂OH, —SiH(OH)₂, and —Si(OH)₃.

15. The process according to claim 12 wherein, in formula (II), n is superior or equal to 2 and/or n is inferior or equal to 500.

16. The process for the production of liquid siloxane hydrogen carrier compounds according to claim 12, said compounds consisting in a mixture of the cyclic siloxane hydrogen carrier compounds of formula (II) and of the linear siloxane hydrogen carrier compounds of formula (I), wherein the cyclic siloxane hydrogen carrier compounds of formula (II) represent more than 50 mole percent of the mixture.

17. The process for the production of liquid siloxane hydrogen carrier compounds according to claim 16 wherein the linear siloxane hydrogen carrier compounds of formula (I) represent more than 2.0 mole percent and less than 20 mole percent of the mixture.

18. The process according to claim 12 wherein, in formula (I), n is superior or equal to 3 and/or n is inferior or equal to 500.

19. The process according to claim 12 wherein, in formula (I), n is superior or equal to four and/or n is inferior or equal to 50.

20. The process according to claim 12 wherein, in formula (II), n is superior or equal to 3 and/or n is inferior or equal to 32.

21. The process according to claim 12 wherein, in formula (II), n is superior or equal to four and/or n is inferior or equal to 17.

* * * * *